United States Patent [19]

Yasui et al.

[11] Patent Number: 5,024,874

[45] Date of Patent: Jun. 18, 1991

[54] THREE DIMENSIONAL FABRIC WITH A LINKAGE STRUCTURE

[75] Inventors: Yoshiharu Yasui; Meiji Anahara; Goro Asahi, all of Kariya; Shiro Miyake, Tokyo, all of Japan

[73] Assignees: Kabushiki Kaisha Toyoda Jidoshokki Seisakusho, Kariya; Japan Defense Agency, Tokyo, both of Japan

[21] Appl. No.: 479,352

[22] Filed: Feb. 13, 1990

[30] Foreign Application Priority Data

Feb. 16, 1989 [JP] Japan ................................. 1-36649
Feb. 16, 1989 [JP] Japan ................................. 1-36650

[51] Int. Cl.$^5$ .............................................. B32B 7/00
[52] U.S. Cl. .................................... 428/257; 428/222; 428/223; 428/225
[58] Field of Search ................ 728/222, 223, 225, 257

[56] References Cited

U.S. PATENT DOCUMENTS

| | | | |
|---|---|---|---|
| 4,336,296 | 6/1982 | Fukuta et al. | 428/257 |
| 4,379,798 | 4/1983 | Palmer et al. | 428/257 |
| 4,686,134 | 8/1987 | Ono | 428/225 |
| 4,725,485 | 2/1988 | Hirokawa | 428/225 |
| 4,782,864 | 11/1988 | Abildskov | 422/225 |

*Primary Examiner*—James J. Bell
*Attorney, Agent, or Firm*—Brooks Haidt Haffner & Delahunty

[57] ABSTRACT

A novel three dimensional fabric is disclosed that has a base formed from a multiplicity of woven strings. The strings are arranged and woven to form a fabric having a multiplicity of warps arranged in a plurality of rows and columns, a plurality of first wefts crossing the warp columns in the interstitial spaces between adjacent warp rows, and a plurality of second wefts crossing said warps and said first wefts in the interstitial spaces between adjacent warp columns. The three dimensional fabric also has a solid linkage mechanism incorporated into the fabric's body by a plurality of the strings that are wound about its periphery.

15 Claims, 20 Drawing Sheets

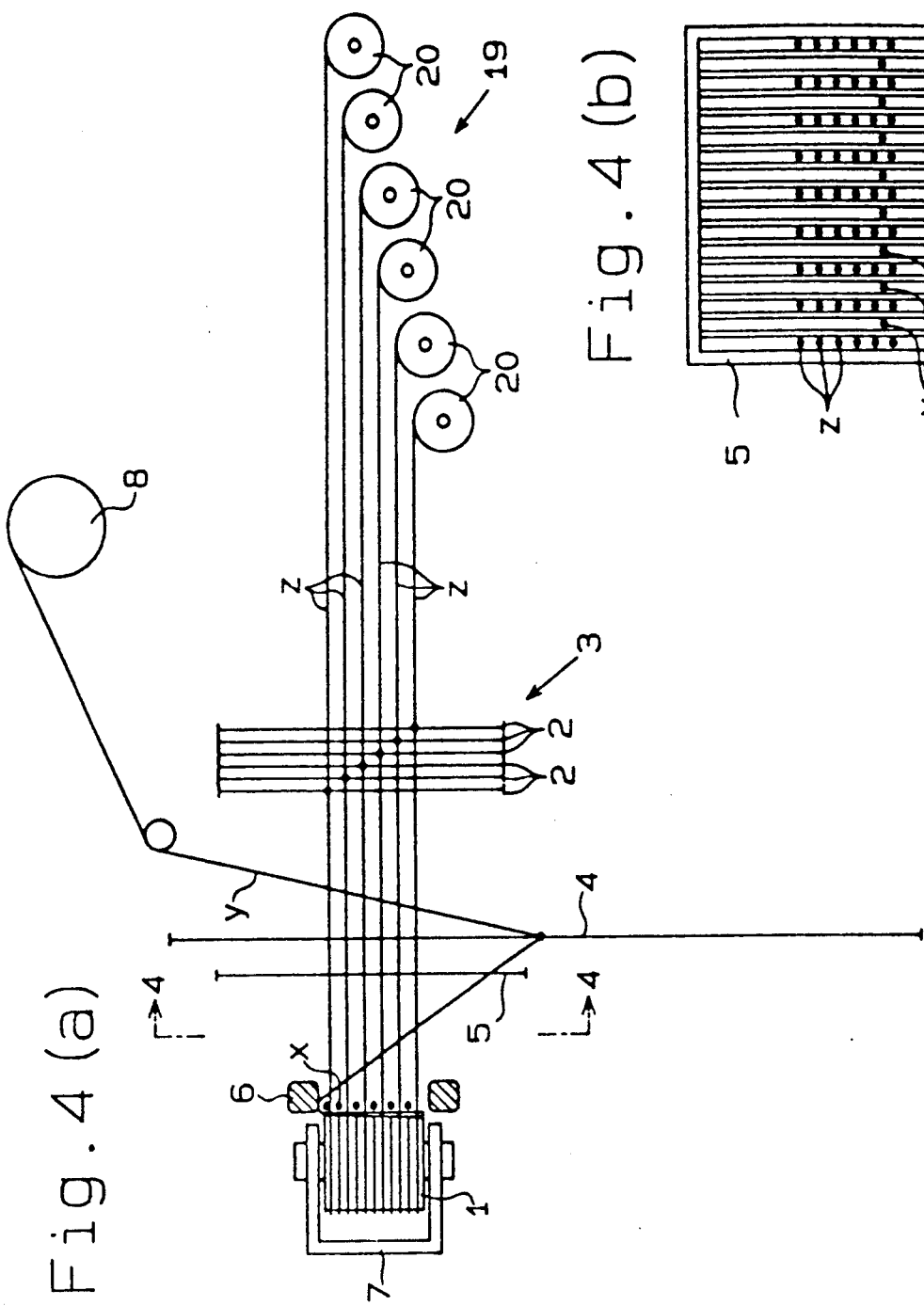

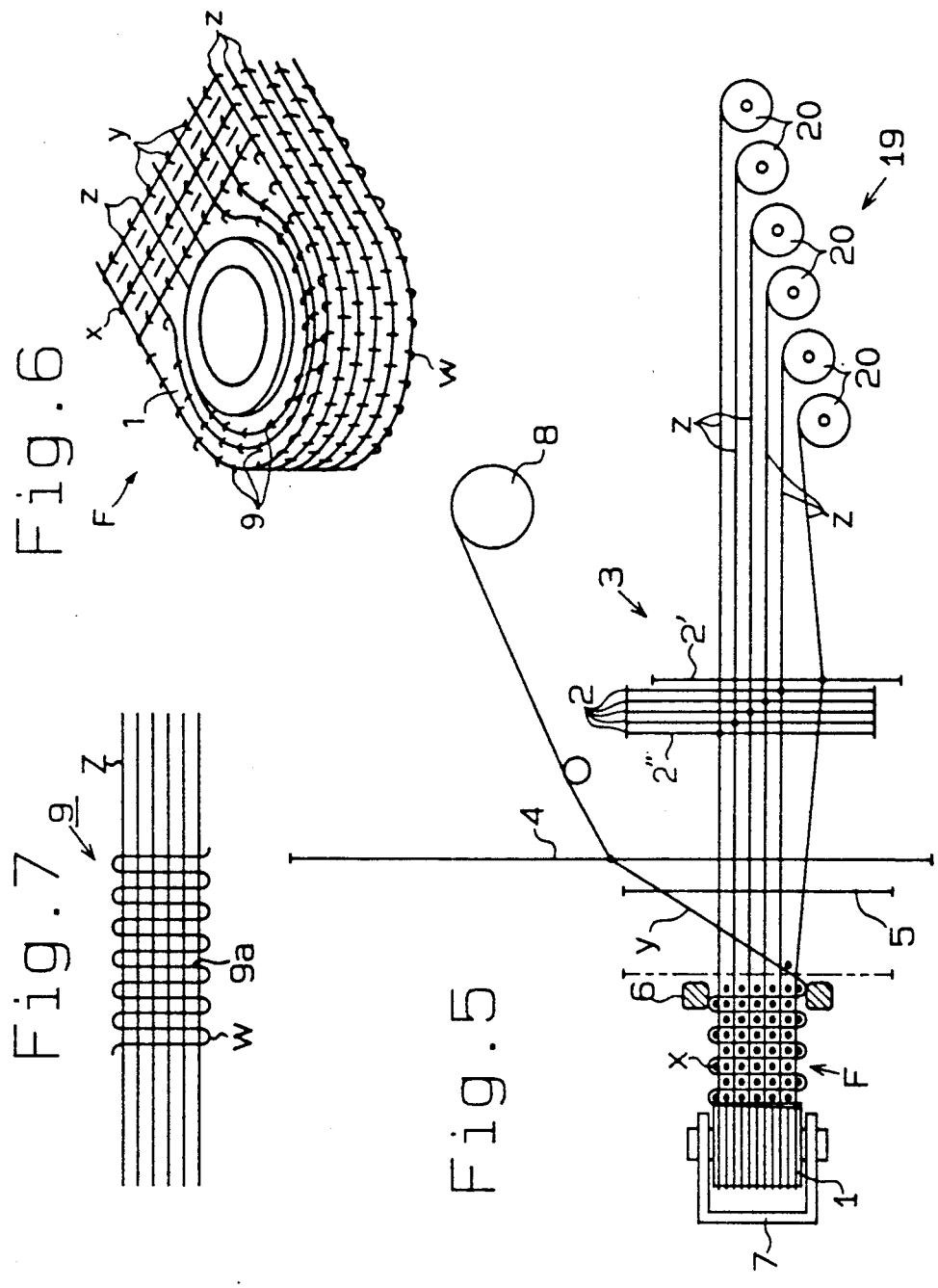

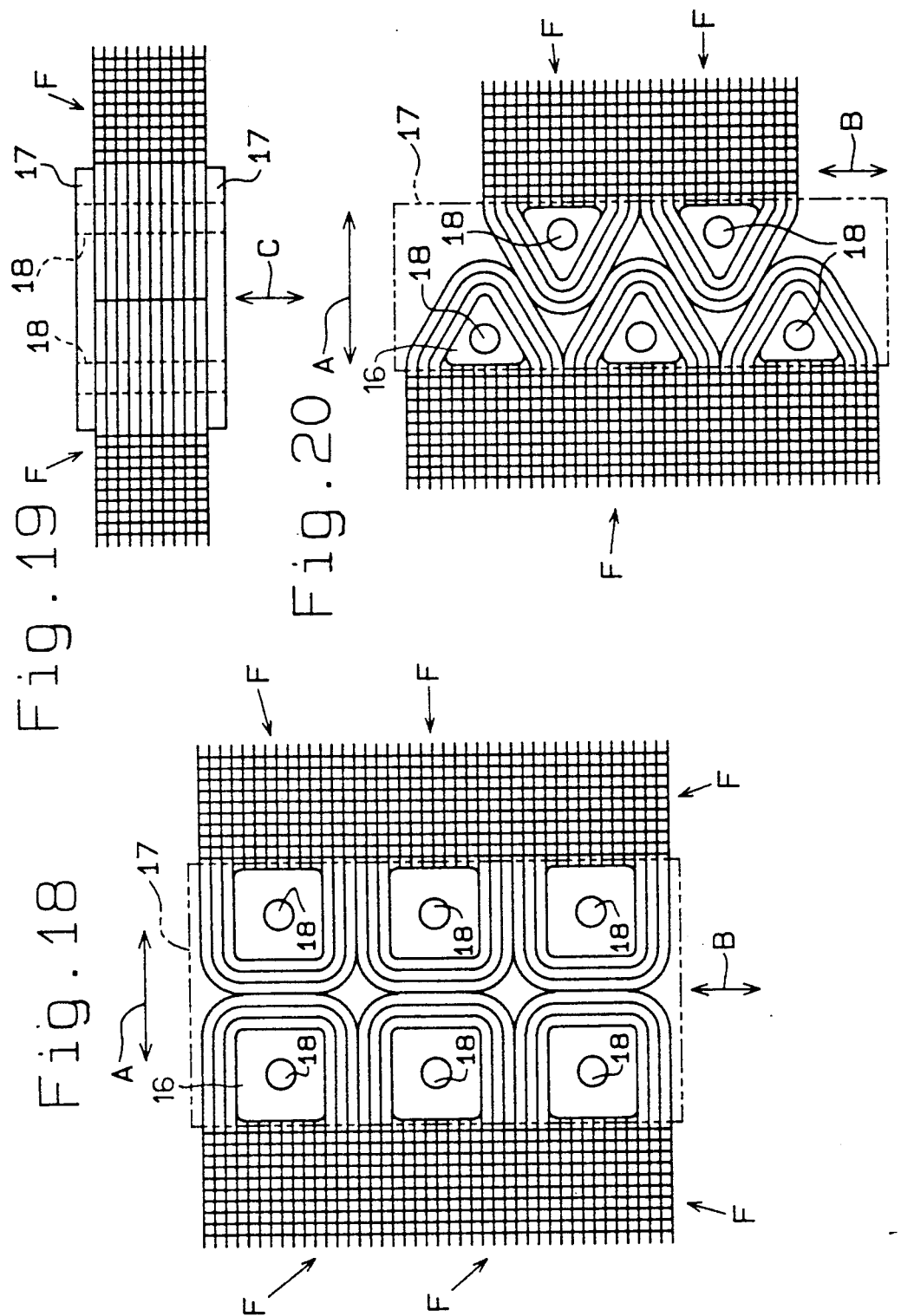

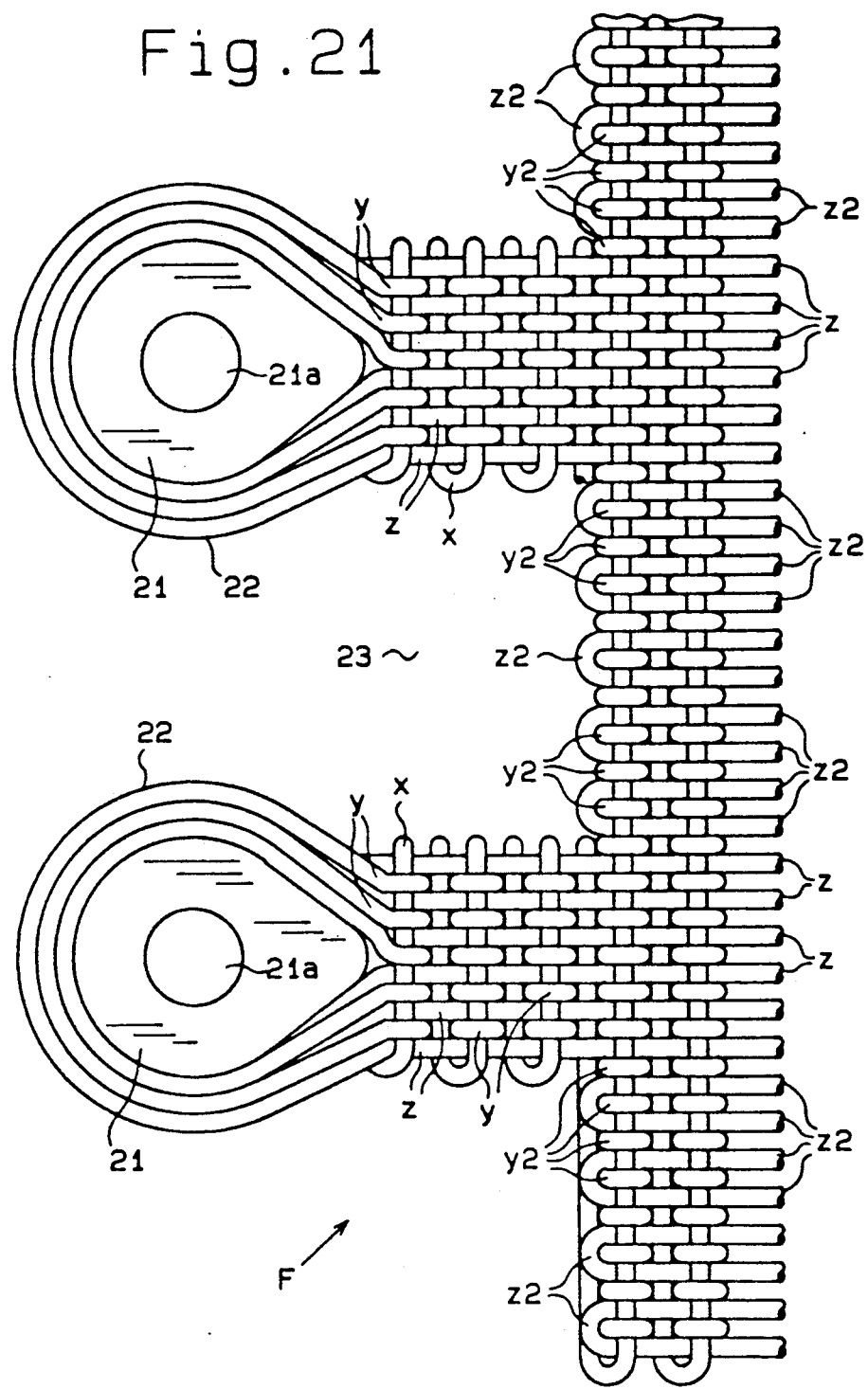

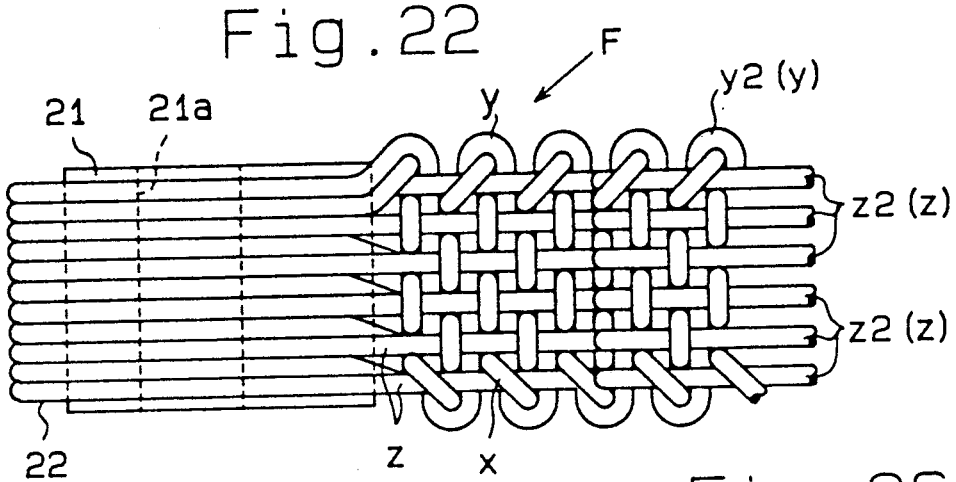
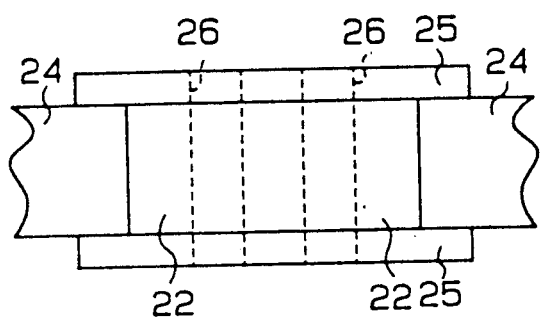
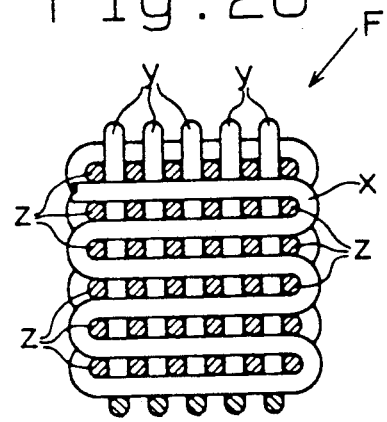
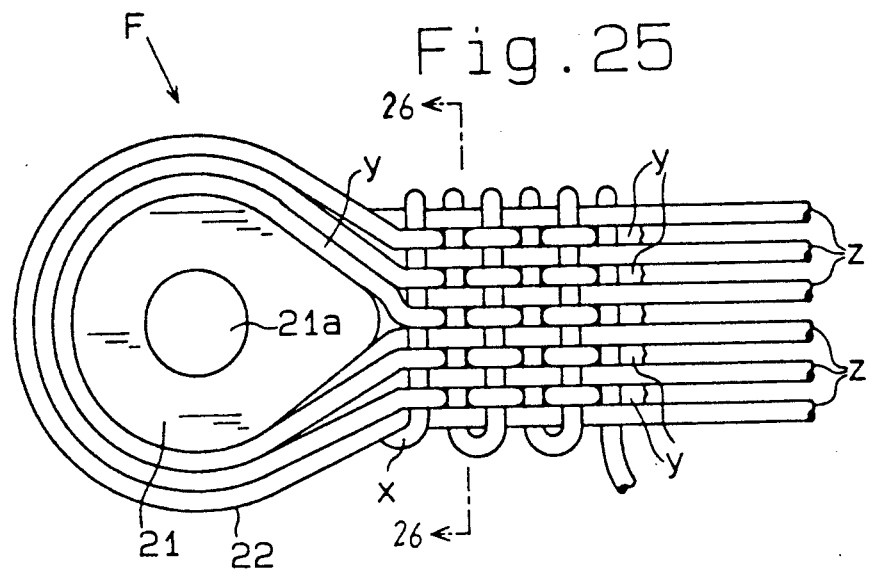

THREE DIMENSIONAL FABRIC WITH A LINKAGE STRUCTURE

The present invention relates generally to three dimensional fabrics and linkage structures for joining three dimensional fabrics to other materials. The described structure is particularly useful in composite members wherein the composite's core material is a three dimensional fabric.

BACKGROUND OF THE INVENTION

Three dimensional fabrics are used in a wide variety of applications. U.S. Pat. No. 4,36,296 discloses a composite member having a core formed from a three dimensional fabric. As disclosed therein, the three dimensional fabric has a multiplicity of warp strings latticed in a plurality of columns and rows. First and second wefts are woven between the columns and rows of the warp strings. The three dimensional fabric forms the core of a composite member and is impregnated with a resin or inorganic material that gives the composite a great deal of strength. The described fabric can be used as a structural member in a wide variety of applications, including rockets, aircraft, automobiles, marine vessels and buildings. However, in order to make good use of the composites, it is desireable to provide a linkage mechanism for coupling the composite members to similar composites and/or other structural members. Such a linkage arrangement is not disclosed in the '296 patent.

In the past, linkages have been provided on composite materials having a laminated cloth cores. Referring to FIG. 36, a composite member 60 has a core formed from a multiplicity of laminated cloth pieces. A metallic bushing 61 multiplicity of laminated cloth pieces. A metallic bushing 61 is inserted into the laminated cloth based composite member 60. A bolt 63 and nut 64 are then used to couple the composite member 60 to structural member 62 or a second composite member.

An application of the same approach to three dimensional fabrics based materials requires that a hole be punched into the fabric in order to receive the metallic bushing. However, when a hole is formed in a composite member having a three dimensional fabric as its base, the fabric's strings are necessarily cut which significantly reduces the fabric's overall strength. Referring specifically to FIG. 37, the strength of fabric F having a hole 65 cut therein will be particularly weakened under the influence of forces in the direction of arrows 69. To compensate for the weaknesses induced by hole 65, the fabric must be enlarged by increasing its length and width. Furthermore, if the hole 65 is punched after a composite member has been formed, subtle cracks may be induced in the composite by the punching action. Such cracks create stress concentrations which weaken the composite member and make it extremely difficult to calculate a given member's actual strength.

Yet another prior art method of joining composite members is adhesive bonding. However, such an approach also has several drawbacks. For example, both the assembly and the disassembly of the members are relatively difficult. Further, the resulting bond strength can vary a great deal due to inherent variations in the bonding process.

Accordingly, there is a need for an improved mechanism for securing three dimensional fabrics and composite members having three dimensional fabric cores to other members, including both structural members (some of which may be metallic) and other composite members.

SUMMARY OF THE INVENTION

Accordingly, it is a primary objective of the present invention to provide a three dimensional fabric having a built in linkage arrangement suitable for coupling the fabric to other members.

Another objective is to provide a linkage structure that may be easily coupled to and uncoupled from other members.

Another objective is to provide a strong linkage assembly that is relatively compact and whose strength can be readily calculated to facilitate design considerations.

To achieve the foregoing and other objects and in accordance with the purpose of the present invention, a novel three dimensional fabric is disclosed that has a base formed from a multiplicity of woven strings. The strings are arranged and woven to form a fabric having a multiplicity of warps arranged in a plurality of rows and columns, a plurality of first wefts crossing the warp columns in the interstitial spaces between adjacent warp rows, and a plurality of second wefts crossing said warps and said first wefts in the interstitial spaces between adjacent warp columns. The three dimensional fabric also has a solid member (generally a linkage mechanism) that is incorporated into the fabric's body by a plurality of the strings that are wound about its periphery.

In a preferred aspect of the invention, both warp and weft strings are wrapped about the linkage mechanism. The linkage mechanism also preferably has a borehole extending therethrough that is adapted to receive a linking member from an external object in order to couple the three dimensional fabric to the external object.

In another aspect of the invention, a pair of linking plates are arranged to sandwich the linkage mechanisms of two different pieces of fabric. Pins are then used to couple the linkage mechanisms to the linking plates. In this manner, the different fabric pieces can be joined.

In a separate preferred aspect of the invention, the fabric is shaped to include a plurality of spaced apart protruding portions that extend outward in the same direction from a main body portion of the fabric. The protruding portions are shaped such that they have enlarged tips that are wider than their bases. The openings defined between adjacent protruding portions are sized similarly to the protruding portions so that the protruding sections of different fabrics can be interleaved when they are coupled together.

In another separate embodiment, the strings wound about the linkage mechanism are woven to form a cloth portion that wraps around at least a portion of the linkage mechanism.

BRIEF DESCRIPTION OF THE DRAWINGS

The features of the present invention that are believed to be novel are set forth with particularity in the appended claims. The invention, together with further objects and advantages thereof, may best be understood by reference to the following description taken in conjunction with the accompanying drawings in which:

FIG. 4(a) is a diagrammatic side view of a weaving arrangement suitable for creating the three dimensional fabric shown in FIG. 1.

FIG. 4(b) is a cross sectional view taken along line 4—4 in FIG. 4(a).

FIG. 5 is a diagrammatic side view of the weaving arrangement shown in FIG. 4(a) at a later stage of the weaving process.

FIG. 6 is a diagrammatic perspective view of the linkage portion of an alternative embodiment of the present invention.

FIG. 7 is side view of the Y-weft weave shown in FIG. 6 that is wrapped around the linkage member.

FIG. 18 is a diagrammatic top view of a linkage arrangement for coupling separate three dimensional fabrics together.

FIG. 19 is a diagrammatic side view of the linkage arrangement shown in FIG. 18.

FIG. 20 is a diagrammatic top view of an interleaved linkage arrangement having triangular linkage members.

FIG. 21 is a top view of the linkage portion of a fourth embodiment of the invention.

FIG. 22 is a side view of the three dimensional fabric shown in FIG. 21.

FIG. 24 is a diagrammatic side view of the linkage arrangement shown in FIG. 23.

FIG. 25 is a top view of the three dimensional fabric of the fourth embodiment during the weaving process.

FIG. 26 is a cross sectional view of the three dimensional fabric shown in FIG. 25 taken along line 26—26.

DETAILED DESCRIPTION OF THE PREFERRED EMBODIMENTS

Figure 1:
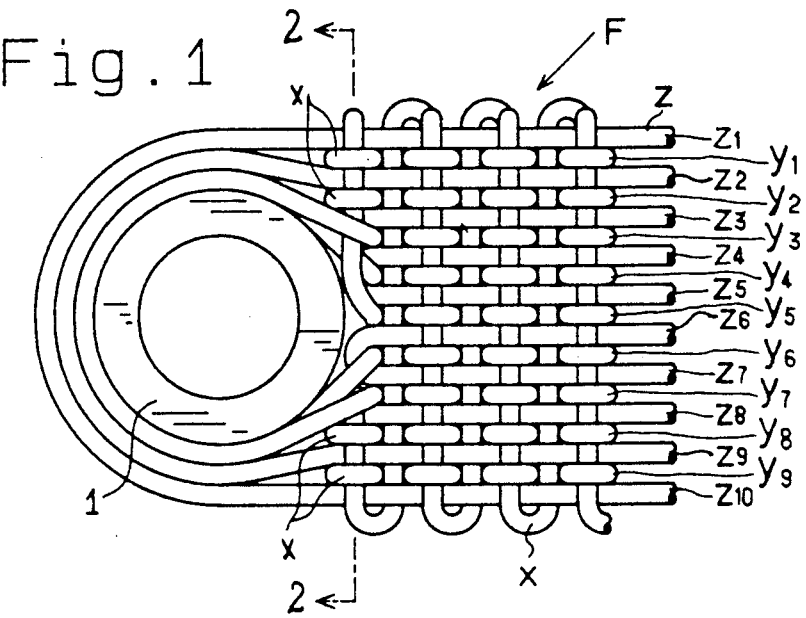
FIG. 1 is a top view of the first embodiment of a three dimensional fabric with a linkage mechanism constructed in accordance with the present invention.

As illustrated in the drawings, the present invention is directed towards a three dimensional fabric having a linkage structure that is wound directly into the fabric during weaving. A first embodiment of the invention is shown in FIGS. 1-5. The geometry of the woven fabric will be described referring initially to FIGS. 1-3, which respectively show the top, end and side views of a three dimensional fabric F. The fabric F has a multiplicity of warp strings Z arranged into several substantially parallel rows and columns. In the embodiment shown, there are ten rows ($Z_1$-$Z_{10}$) and six columns making a total of sixty apparent warp strings. A metallic bushing 1 is arranged at one end of the three dimensional fabric F and the outer warps are looped about the outer periphery of the bushing 1 and doubled back such that a single fabric string forms two of the warps. The inner four rows of warp strings are turned about the first wefts Y (described below). Accordingly, the actual number of strings used as the warps Z is one half of the apparent number of strings that form the warps of the Z group.

Since the fabric is created in three dimensions, two different weft threading patterns are used. For convenience, they are referred to as the first wefts Y and the second wefts X respectively. The Y wefts are threaded up and down through the interstitial space between each pair of adjacent warp rows with an independent apparent weft string being provided for each row interstice. The Y wefts run substantially perpendicular to the warps Z and extend the entire height of the warp columns, with their progress moving in the direction of the warps away from the bushing 1. In the described embodiment, since there are ten (10) warp rows, there are nine (9) apparent first-weft strings ($Y_1$-$Y_9$).

The X wefts are created from a single string woven between the columns of the warps Z while perpendicularly crossing the warps Z and the Y wefts. The actual threading of the weft strings in the body of the three dimensional fabric is more completely described in U.S. Pat. No. 4,336,296. All of the weft strings are looped about the bushing 1 to define opposite sides which are respectively woven as independent apparent weft strings. One of the weft string forms both the middle apparent first weft string $Y_5$ and the second weft string X. The remaining weft strings are looped about the bushing 1 to form two of the apparent weft strings Y. Thus, in the described embodiment, five weft strings are used, with four strings being doubled about the bushing 1 such that each of its opposite ends (i.e. strings $Y_1$-$Y_4$ and $Y_6$-$Y_9$) fill an independent row interstice. As best seen in FIG. 1, the inner warp strings $Z_4/Z_5$ and $Z_6/Z_7$ are looped about wefts $Y_4$ and $Y_6$ respectively, as opposed to the bushing 1.

Figure 2:
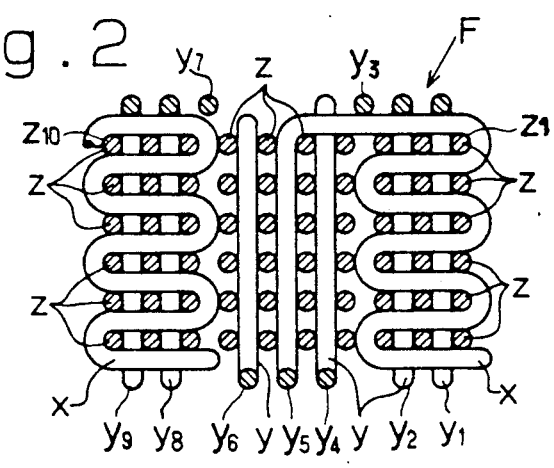
FIG. 2 is a cross sectional view of the fabric shown in FIG. 1 taken along line 2—2 in FIG. 1.
Figure 3:
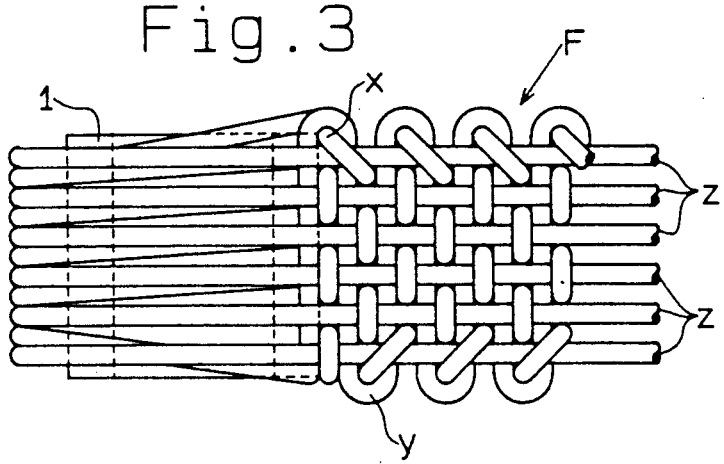
FIG. 3 is a side view of the fabric shown in FIG. 1.

The last weft string is also doubled about the bushing 1 with its first side forming weft string $Y_5$ which is threaded between the middle warp rows $Z_5$ and $Z_6$. The opposite end of that string is weaved to form the X wefts. As seen in FIG. 2, the middle first weft string $Y_5$ is manually wound through one side of the warp matrix as seen in FIG. 2 before it is wrapped around bushing 1 wherein that string's opposite side becomes the second weft string X. In the embodiment shown, weft string $Y_5$ is wrapped around the right hand side of the warp matrix as seen in FIG. 2. The X weft string is initially wound about the opposite side of the warp matrix before it begins its normal weaving across the entire width of the fabric F.

As described above and in conjunction with the '296 patent the three dimensional fabric may be impregnated with resin to form a strong composite material. The bushing 1 then forms a strong linkage mechanism which can readily couple the composite member to any desired outside member. The described bushing linkage arrangement, is quite strong since almost every one of the warps Z can bear a portion of any tensile force applied to the metallic bushing 1.

Referring next to FIGS. 4 (a) and 5, a mechanism for and method of weaving the three dimensional fabric F will be described. A foreweaving frame 6 is provided at one end of the weaving mechanism and a warp feed structure 19 is provided on the opposite end. The warp feed structure 19 has a multiplicity of beams 20 to which the various warp may be secured. An independent beam 20 is provided for each warp column to secure each of the warps within its associated column. A warp opening device 3 having a plurality of warp healds 2 is provided to "open" or "widen" the intersticial spaces between adjacent warp columns. The warp heald 2' associated with the lowermost warp column is set apart from the other healds 2 and thus, the interstitial space adjacent the warps carried by heald 2' is in its open position in FIG. 5.

A weft heald 4, positioned between the warp opening device 3 and the foreweaving frame 6 is provided to insert the first wefts Y into each warp row interstice. The weft heald is movable up and down from the positions shown in FIGS. 4 (a) and 5 respectively to impart the necessary vertical translation to the Y wefts. The first weft strings are threaded through the weft heald 4 and wound about a supply beam 8 of a weft feed structure. A reed 5 is arranged between the foreweaving frame 6 and the weft heald 4 such that it is moveable back and forth from a beating position adjacent the foreweaving frame 6 (as seen in the double dashed line of FIG. 5) to a withdrawn position near the weft heald 4 (as shown as a solid line in FIG. 5).

A moveable supporting member 7 is positioned outside of the foreweaving frame 6 in order to support the bearing during the weaving process. A driving mechanism (not shown) is provided to carry the support member away from the foreweaving frame 6 (towards the left as seen in FIGS. 4 (a) and 5) during the weaving process to move the newly created three dimensional fabric away from the foreweaving frame.

To facilitate weaving, the outer warp strings (i.e. those in columns $Z_1$-$Z_3$ and $Z_8$-$Z_{10}$) are looped about the bushing 1 and passed through the appropriate warp healds 2 of the warp opening device 3. The warps are then each wound around the appropriate beam 20 of warp feed structure 19 that is associated with their designated warp column. The weft strings are also looped around the bushing 1. The Y weft string ends are then passed through weft heald 4 and wound about weft supply beam 8. The middle warp strings (used in warp columns $Z_4/Z_5$ and $Z_6/Z_7$) are doubled about warps $Y_4$ and $Y_6$ respectively, instead of the bushing 1 (as best seen in FIG. 1). They are then threaded through the appropriate warp healds 2 to their associated supply beams 20 just as the outer warp strings. As indicated above, the middle first weft string $Y_5$ is manually wound through the warp matrix as seen in FIG. 2 before it is wrapped around bushing 1 wherein its second side becomes the X weft string. The X weft string is wound around a bobbin carried by a conventional shuttle (not shown).

After the warp and weft strings have been properly laid out, the linkage bushing 1 is fixed to its supporting member 7. Initially, the supporting member 7 is positioned adjacent the foreweaving frame 6 and the weft heald 4 is placed in its lowered position as shown in FIG. 4(a). The healds 2 of the warp opening device are initially placed at a lowered position.

To initiate weaving, the healds 2 are sequentially moved upward beginning with the heald 2" located closest to the foreweaving frame 6 and ending with the heald 2' located furthest away from the frame. Each heald movement creates a warp opening between adjacent warp columns through which the bobbin shuttle is passed. The shuttle is successively passed through each of the openings to insert the X wefts into the interstices of the warp columns. Therefore, the X wefts perpendicularly cross the warps Z. The reed 5 is moved from its withdrawn position into its beating position after each X weft is laid to beat the weft into place. After the X wefts have been inserted and beaten around the lowermost warp column, weft heald 4 is moved to its upper position as seen in FIG. 5. The strings of the Y wefts are thus turned around such that they extend upward as seen in FIG. 5. The healds of warp opening device 3 are then sequentially actuated in reverse order to form the warp openings successively from the bottom to the top. As before, the shuttle is passed between each successive warp opening to insert the X wefts and the reed 5 repeats its beating motions. The insertion of the Y wefts and the insertion and beating of the X wefts are then performed alternatively as described above to weave the desired fabric. Throughout the weaving process, the supporting member 7 is moved horizontally away from the foreweaving frame 6 to accommodate taking up the slack as the fabric grows.

Referring next to FIGS. 6 and 7, a second embodiment of the invention will be described. In the first described embodiment, the strings used to form warps Z and both the X and Y wefts were merely looped about outer periphery of the bushing 1. Although this is a simple and inexpensive way to couple the bushing to the fabric, in certain circumstances, the strings wound about the bushing may slide in the axial direction of the bushing and bunch up, which is undesirable. The second embodiment differs from the first in that a plurality of woven cloth layers 9 are wound around the bushing as opposed to loose strings. The wefts of the cloth layer tend to prevent the strings from sliding and thereby maintain the shape of the fabric about the bushing.

To produce the woven cloth layers, wefts W are woven into the outer warp strings Z that loop around the bearing 1. Each cloth layer is formed from a column of outer warp strings Z. The wefts W are made by weaving selected weft strings Y through the portions of outer warp strings Z that are to be wound about the bushing as seen in FIG. 7.

In the described embodiment, there are three cloth layers 9. The strings extending from each end of the cloth layers form the outer warps. As such, they pass through the healds 2 of the warp opening device to be wound around the beams 20 of warp feed structure 19 as described with respect to the first embodiment. The opposing ends of the weft strings that are used to weave the cloth layers are also strung through the weft heald or to the bobbin just as the weft strings of the first embodiment. Accordingly, the three dimensional fabric can be woven in the same manner as described with respect to the first embodiment.

Figure 8:
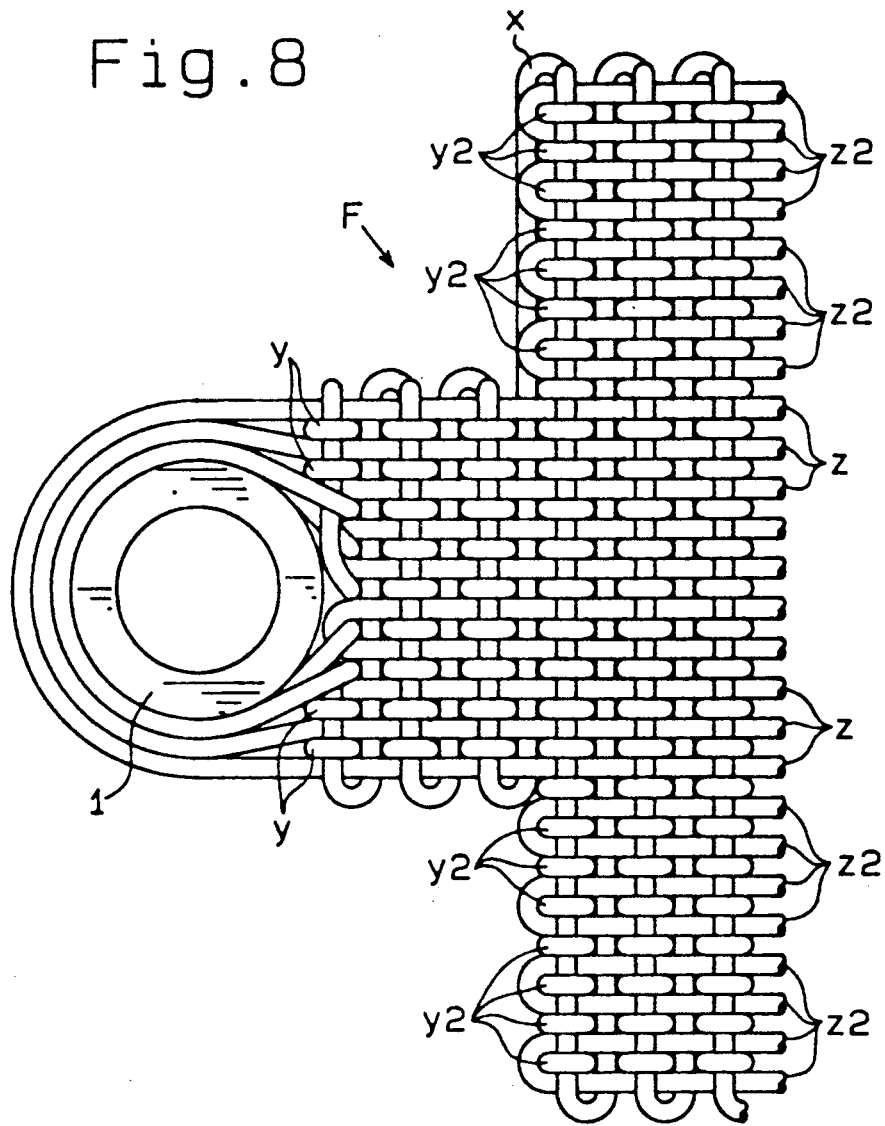
FIG. 8 is a top view of the linkage end of a third embodiment of the present invention.
Figure 9:
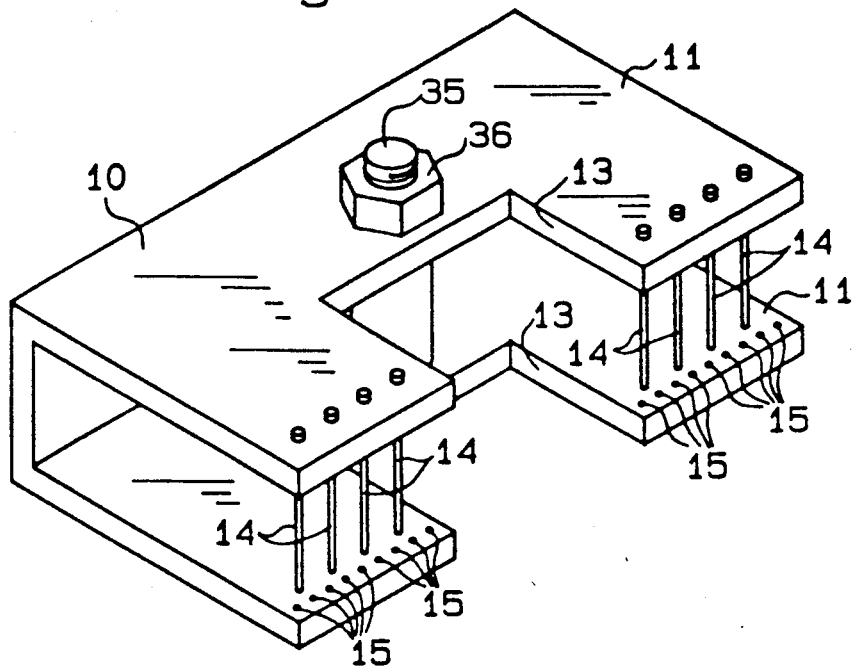
FIG. 9 is a diagrammatic perspective view of a supporting member suitable for supporting the fabric shown in FIG. 8 during weaving.

Referring next to FIGS. 8 and 9, a third three dimensional fabric embodiment will be described. In the first two embodiments, the outer warp strings, as well as all of the weft strings were wound about the bushing. As can be seen in FIG. 8, the third embodiment differs from the first two in that although the outer warp strings of the initial portion of the three dimensional fabric F are wound about the bushing, the fabric's width becomes wider away from the bushing and the warp and weft strings of the widened fabric portion are not wrapped about the bushing.

Referring next to FIG. 9, a supporting member 10 is used in conjunction with the weaving apparatus in order to produce a fabric configured as in FIG. 8. The supporting member 10 has a base portion from which a pair of spaced apart matched upper and lower supporting segment 11 depend to form a channel when viewed from its side. A bolt 35 extends between the opposing upper and lower supporting segments 11 in a position away from the base. A nut 36 secures the bolt 35 in place. The nut and bolt arrangement is intended engage the linkage bushing 1 in order to secure the fabric to the support member 10 during weaving. A notch 13 is formed in the center of the tip end of the upper and lower supporting segments 11. The notch 13 corresponds to the narrower portion of the three dimensional fabric F.

It should be appreciated that the additional width of the wider portion of the fabric requires the use of additional warps Z2 and Y weft strings Y2. Since the additional strings cannot be wound around the bushing, they are anchored by the supporting member 10. To secure the additional warps, two sets of insertion holes are positioned opposite each other on the tip ends of the upper and lower supporting segments 11. Supporting pins 14 are detachably fitted into opposing insertion holes to provide about which the strings which form warps Z2 can be turned. Hooking holes 15 formed between the insertion holes of each supporting segment 11, are provided to anchor the added weft strings Y2.

To produce this three dimensional fabric F, the narrower fabric portion is initially woven using the same procedure as described above with respect to the first or second embodiments. Once the narrower section has been completed, the weaving apparatus' bushing supporting member 7 is replaced by supporting member 10 shown in FIG. 9. The bushing 1 is then anchored by journaling it about bolt 35. The additional warps Z2 are looped around the supporting pins 14 and their ends are secured to appropriate beams 20 of warp feed structure 19. The additional Y2 weft strings are set in the hooking holes 15 of supporting member 10 with their opposite ends being past through weft heald 4 to be wound around the beam of the weft providing portion 8. The broader portion of the three dimensional fabric F is then woven using the same operations as described above with respect to the first two embodiments. Adjacent warps are separated by the workings of the weft opening device 3 and the X wefts are successively inserted into those openings. The Y wefts are inserted into the interstices between adjacent warp rows in accordance with the vertical movements of the weft heald 4 to weave the entire broader sections of the three dimensional fabric F.

Figure 10:
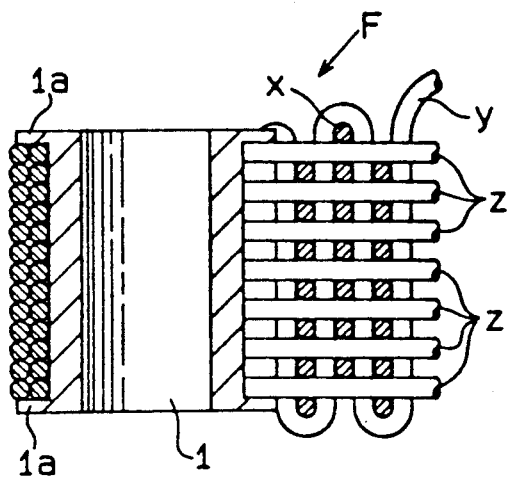
FIG. 10 is a cross sectional view of a flanged bushing configuration.
Figure 11:
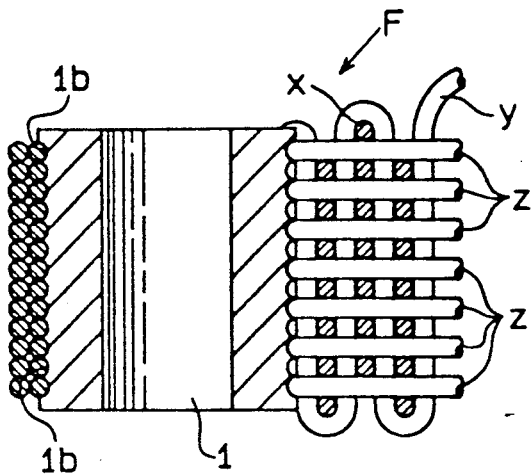
FIG. 11 is a cross sectional view of a grooved bushing configuration.

Referring next to FIGS. 10 through 13, a few alternative linkage bushing structures will be described. These alternative bushing structures are intended to prevent the strings or cloth materials wrapped around the bushing 1 from moving in an axial direction relative to the bushing. As can be seen in FIG. 10, the bushing 1 may be provided with flanges $1a$ at its opposite ends to restrain axial movements of the fabric wrapped around the bushing. Alternatively, circumferential grooves $1b$ may be formed in the outer periphery of the bushing as seen in FIG. 11 to accomplish the same effect.

Figure 12:
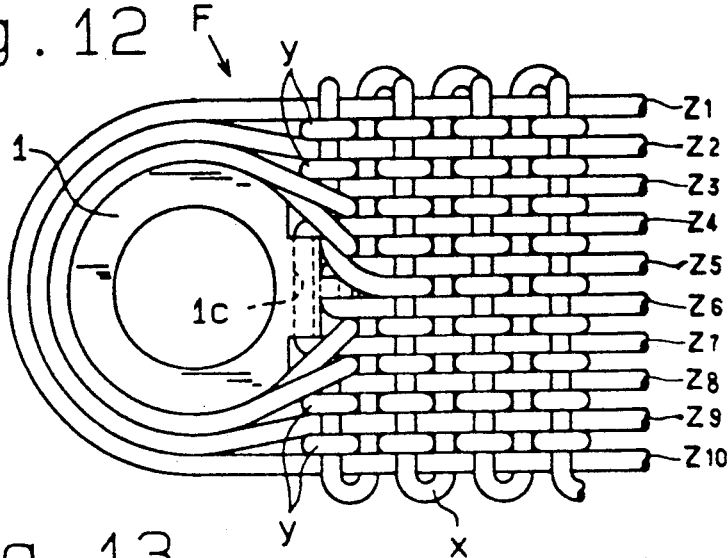
FIG. 12 is a top view of a bushing arrangement incorporating a string insertion hole adjacent the three dimensional fabric.

FIG. 12 show another alternative bushings arrangement having a string insertion hole $1c$ cut therein. The string insertion hole $1c$ is cut into the bushing on a side adjacent the body of the three dimensional fabric and is intended to receive one or more of the fabric's strings in order to better anchor the fabric to the bushing. In the embodiment shown, the chosen string(s) threaded through the string insertion hole $1c$ come from those turned between the $Z_4/Z_7$ warp rows.

Figure 13:
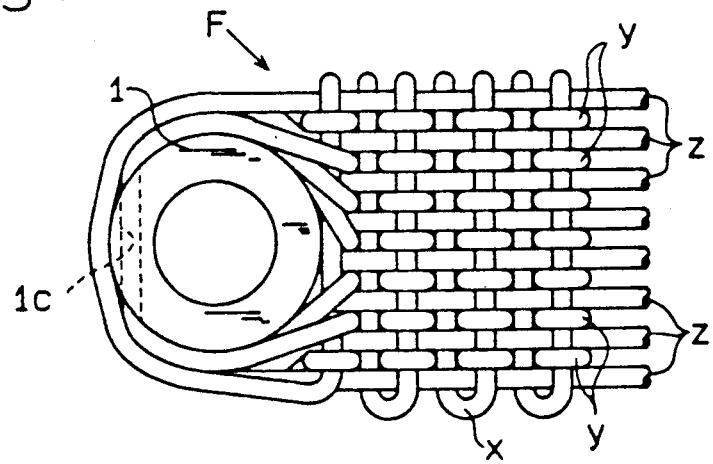
FIG. 13 is a top view of a bushing arrangement incorporating a string insertion hole opposite the three dimensional fabric.

An alternative placement of the string insertion hole $1c$ is shown in FIG. 13. In the latter embodiment, the string insertion hole $1c$ is cut into the bushing on a side opposite the body of the three dimensional fabric and is intended to receive one or more of the strings wrapped around the bushing in order to better anchor the fabric to the bushing.

Figure 14:
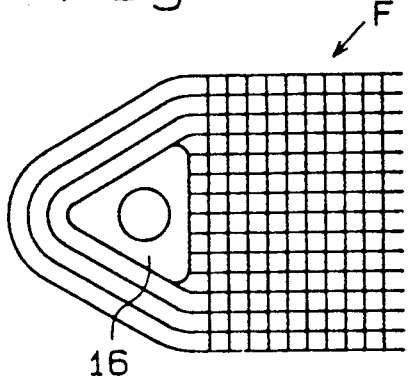
FIG. 14 is a diagrammatic top view of an alternative linkage mechanism having a substantially triangular cross section.
Figure 15:
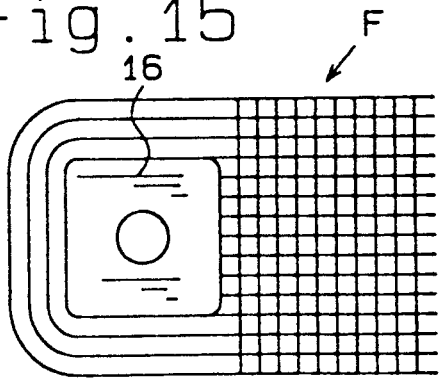
FIG. 15 is a diagrammatic top view of an alternative linkage mechanism having a substantially square cross section.

Referring next to FIGS. 14 and 15, it should be apparent that the solid linkage members woven into the three dimensional fabric need not be cylindrical in shape. For example, as seen in FIG. 14, a pipe 16 having a triangular cross section may be used in place of the bushings described above. Alternatively, as seen in FIG. 15, the pipe 16 may have a substantially rectangular cross section. Of course, the linkage member may take a wide variety of other shapes as well to meet the needs of a particular design.

Figure 16:
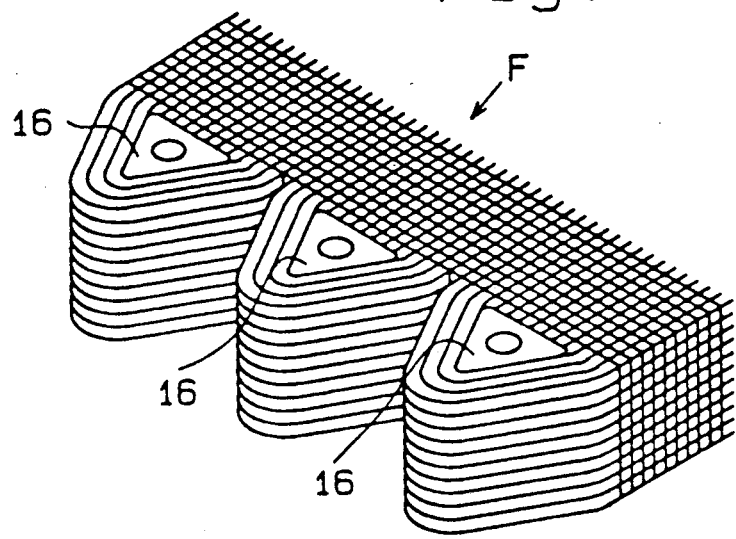
FIG. 16 is a diagrammatic perspective view of the linkage portion of a three dimensional fabric highlighting a multiple linkage member construction.
Figure 17:
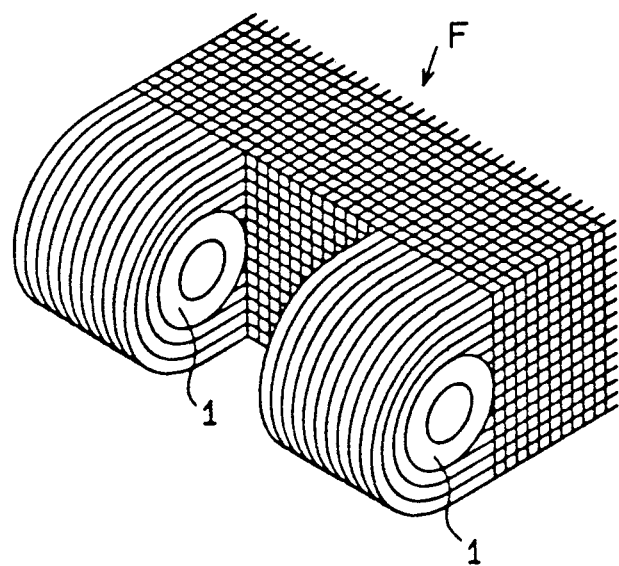
FIG. 17 is a diagrammatic perspective view of the linkage portion of a three dimensional fabric highlighting an alternative multiple bushing construction.

Referring to FIGS. 16 and 17 it should be apparent that a plurality of solid linkage members may be woven into the three dimensional fabric. For example, in FIG. 16, three substantially triangular cross sectioned pipes 16 are woven adjacent each other into the fabric F. In the embodiment shown in FIG. 17 a pair of bushings 1 are woven into the fabric F in spaced apart relation. Additionally, the bushings of FIG. 17 are arranged such that their axes extend in a horizontal direction relative to the width of the fabric F.

Referring next to FIGS. 18–20, a mechanism for joining separate three dimensional fabrics together will be described. Referring specifically to FIGS. 18 and 19, separate fabrics F each having rectangular shaped linkage members are sandwiched by a pair of upper and lower linking plates 17 that are positioned on opposite sides of the linkage members 16 as best seen in FIG. 19. Pins 18 extend all of the way through both of the linking plates 17 as well as boreholes in the rectangular linkage members (or pipes) to couple the linking plates 17 to the three dimensional fabrics F. Since each of &:he fabrics F is fixedly coupled to the linking plates 17, the described linkage arrangement effectively couples the fabrics F together. Forces in the directions of arrows A, B, and C can all be supported by the linking plate/securing pin structure described.

Referring next to FIG. 20, fabrics having linkage members comprised of substantially triangular cross sectioned pipes 16 can also be joined using the linking plate structure described above. In the triangular linkage member embodiment, the tip ends of the respective fabrics are arranged such that the triangular pipes 16 are interleaved as shown in FIG. 20. In such an arrangement, any force in the direction of arrow B is supported mainly by the three dimensional fabrics while the linking plate/securing pin structure is capable of supporting forces in the direction of arrow A and the direction of arrow C shown in FIG. 19.

It should be appreciated that the X wefts can be formed from a plurality of strings as opposed to the single string described above. This is particularly relevant for the three dimensional fabrics having multiple linkage members as shown in FIGS. 16–20. Specifically, during weaving a rapier (not shown) can be used to reverse the direction of the second weft string X within a selected warp opening. The loop formed thereby may then be held in place by a selvage string (not shown).

Referring next to FIGS. 21–31 a fourth embodiment of the invention will be described. The fourth embodiment incorporates a three dimensional fabric that has a plurality of spaced apart protruding portions 22 extending away from the main body of the fabric. As in the preceding embodiments, the fabric has a multiplicity of warps Z and Z2 that are arranged in a plurality of columns and rows. First wefts Y and Y2 are woven between adjacent warp rows such that they are separate and continuous in each stack of rows while they perpendicularly cross the warps Z and Z2 respectively. The second weft strings X are woven between the warp columns while perpendicularly crossing the warps Z and Z2, as well as the first wefts Y and Y2.

Each of the protruding portions 22 has a solid linkage member 21 woven therein. In the embodiment shown, all of the strings forming the X and Y wefts of the protruding portions, as well as the Z warps of the protruding portions are wound around their associated solid linkage members to firmly couple the solid linkage member into the woven fabric. In the described embodiment, the protruding portions are all arranged at one end of the three dimensional fabric and extend longitudinally of the warps.

The solid linkage members 21 are tapered towards the main body of the fabric and may be formed from metal, ceramics, plastic or other suitable material depending upon their required capabilities. An insertion hole 21a extends axially through the middle of each linkage member 21. The protruding portions 22 are arranged such that the openings 23 formed between adjacent protruding portions have a narrowed neck region and an enlarged cavity portion dictated by the shape of the protruding portions 22.

The use of the various individual strings within each protruding portion 22 is somewhat different in this embodiment than those previously described. Specifically, in the fourth embodiment, (which has six warps in each row and thus has five Y wefts per row) two weft strings are provided which are each wrapped around the linkage member. Both ends of each of these two strings are used as Y wefts within the protruding portion. The opposite end of the final Y weft is used as a warp in contrast to use as the X weft as in the previously described embodiment. The second end of the string used to form the X wefts in the fourth embodiment also is used as a warp string. The remaining four warps are provided by the opposite ends of dedicated warp strings.

It should be appreciated that each protruding portion 22 has an X weft string. In the embodiment shown in FIGS. 21 and 22, only one of the X weft strings is used to create the X wefts of the main body portion of the three dimensional fabric F (the X weft string of the lower protruding portion). The remaining X weft strings are cut off at the base end portion of their respective protruding portions 22 after finishing weaving the X wefts of their associated protruding portions (as seen at the base of the upper protruding portion in FIG. 21). In all other respects, the three dimensional fabric may be woven in the manner described above.

Figure 23:
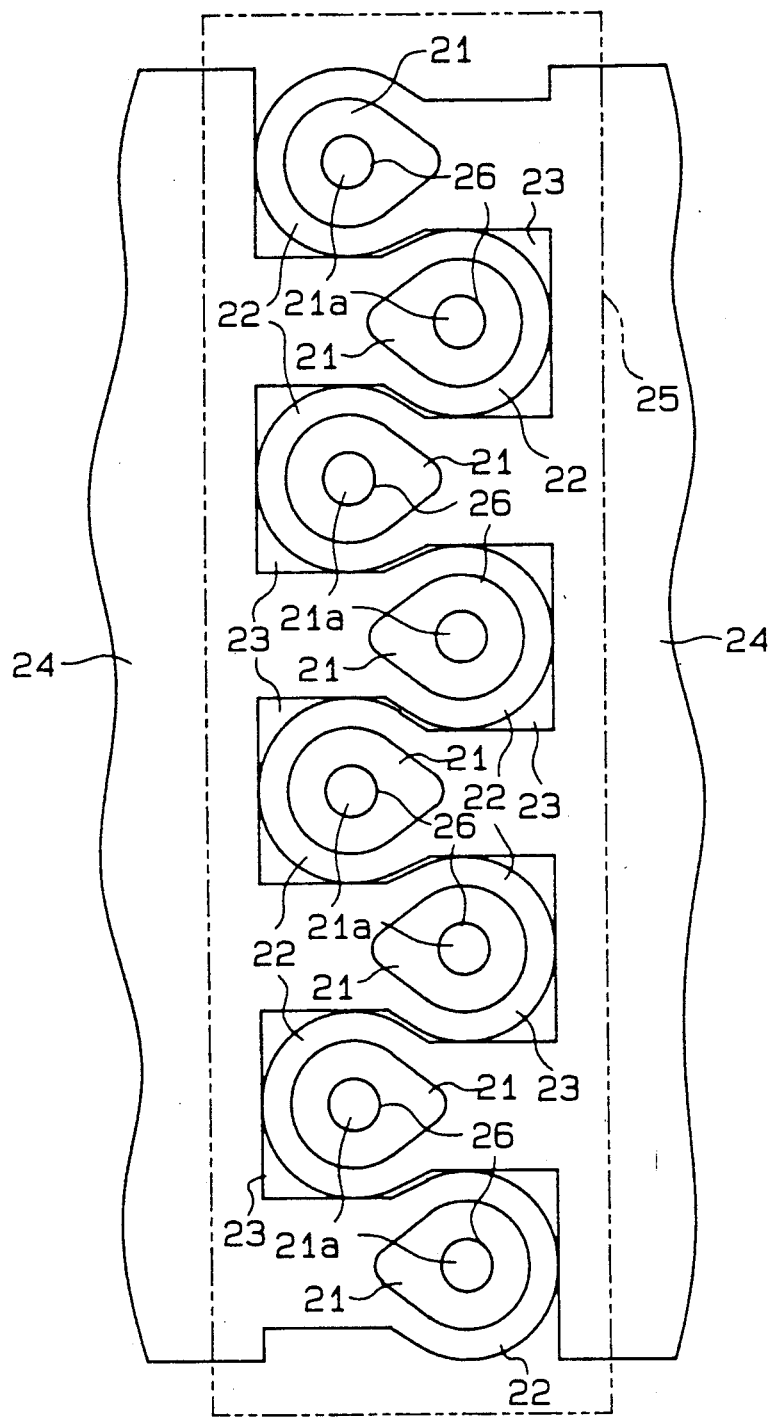
FIG. 23 is a diagrammatic plan view of an interleaved linkage arrangement for a three dimensional fabric similar to the one shown in FIG. 21.
Figure 27:
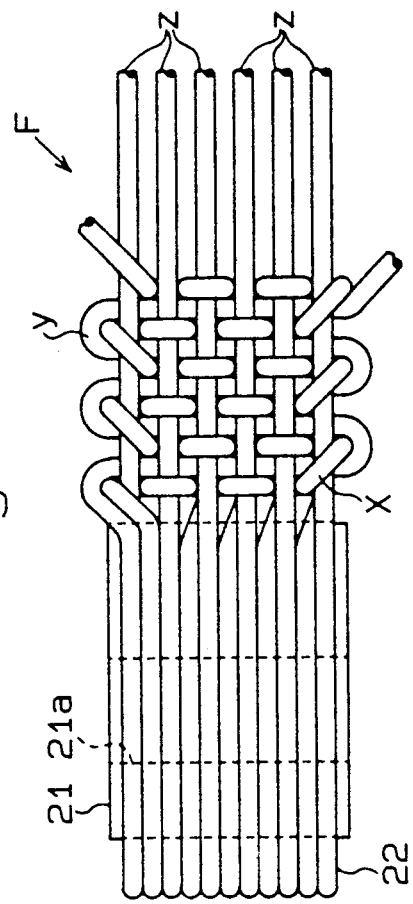
FIG. 27 is a side view of the three dimensional fabric shown in FIG. 25.

As indicated above, the three dimensional fabric may be impregnated with a resin to create a composite member. Referring next to FIGS. 23 and 24, an arrangement suitable for coupling a pair of composite members 24 will be described. The composite members 24 are formed in the manner shown in the fourth embodiment shown above. The openings 23 are sized to closely receive both the head and neck portions of the protruding portions 22. Accordingly the protruding portions of the two composite members may be linked in an interleaved fashion.

In order to prevent separation of the composite members 24 in the vertical direction (i.e. in a direction crossing the plane of FIG. 23), upper and lower linking plates 25 are positioned on opposite sides of the linkage portions of the composite members in a manner similar to that described in relation to FIGS. 18–20. The linking plates 25 are secured together using pins 26 which extend through the insertion holes 21a in solid lining members 21. With the arrangement show, when a tensile force is applied to the composite members, the forces exerted against the tapered portions of the protruding portions 22 would work to somewhat expand the opening 23. Therefore, the linking plates also serve to bear a portion of tensile forces applied to the composite members 24. It is noted that the warps Z that bear the tensile forces against the linkage portion of the composite members 24 are quite strong and as such, compact wraps can be made about the solid linkage member 21.

A method for manufacturing the three dimensional fabric of the fourth embodiment will now be described with reference to FIGS. 28 and 29. Since the described weaving apparatus is very similar in construction to the weaving apparatus previously described, the numerals designating members corresponding to components of the earlier described system will be marked with corresponding numbers with the addition of an "a" in order to omit a repetitive explanation.

Two different support structures are provided which can be placed adjacent foreweaving frame 6a in place of support 7 in the last described embodiment. A support member 32 (FIGS. 28 and 29) is adapted to support a single solid member 21, while support member 33 (FIGS. 30 and 31) is adapted to hold a plurality of solid linkage members 21, the Z2 warps, and the Y2 wefts.

Figure 28:
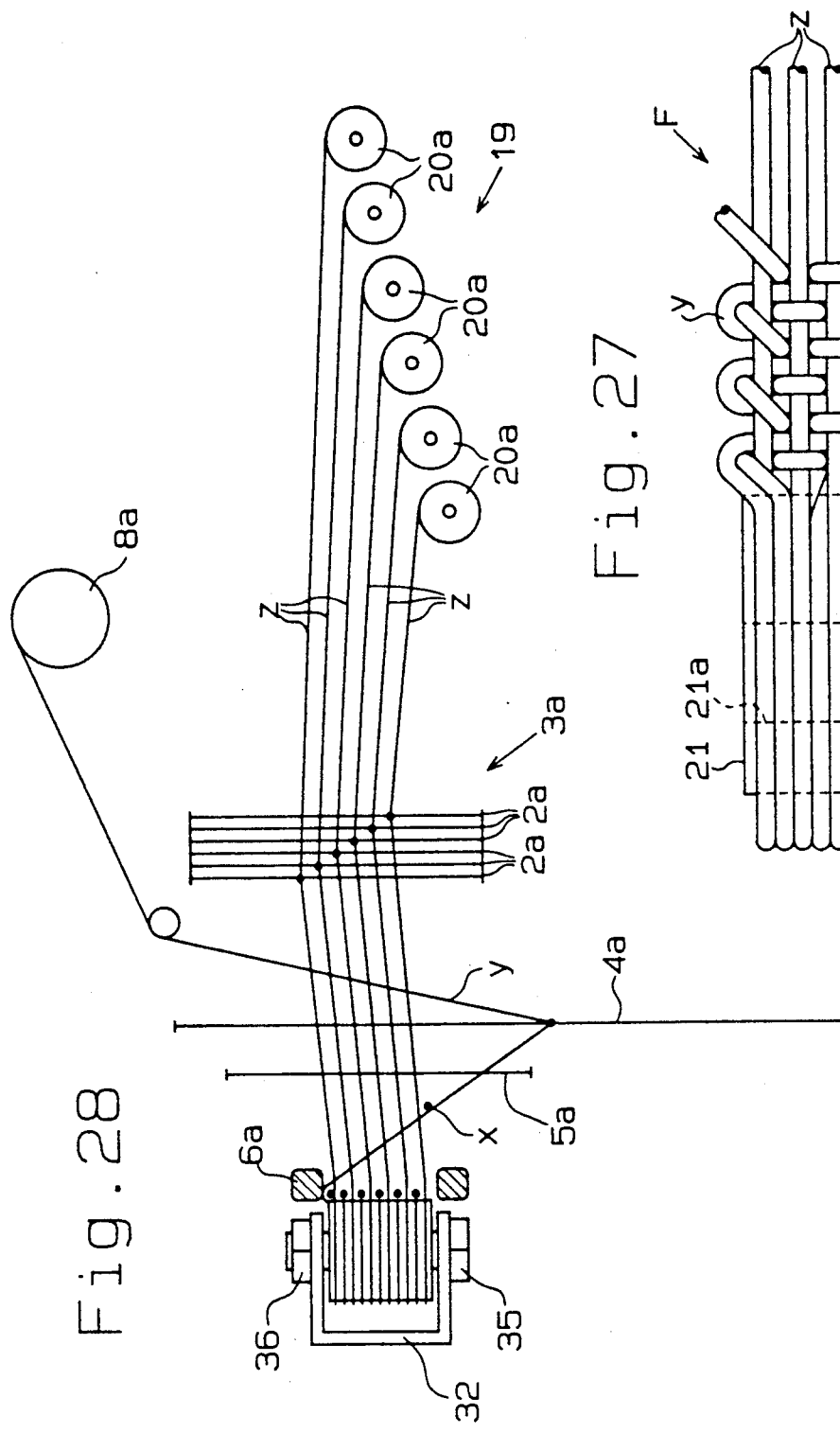
FIG. 28 is a diagrammatic side view of a weaving arrangement suitable for creating the three dimensional fabric of the fourth embodiment.
Figure 29:
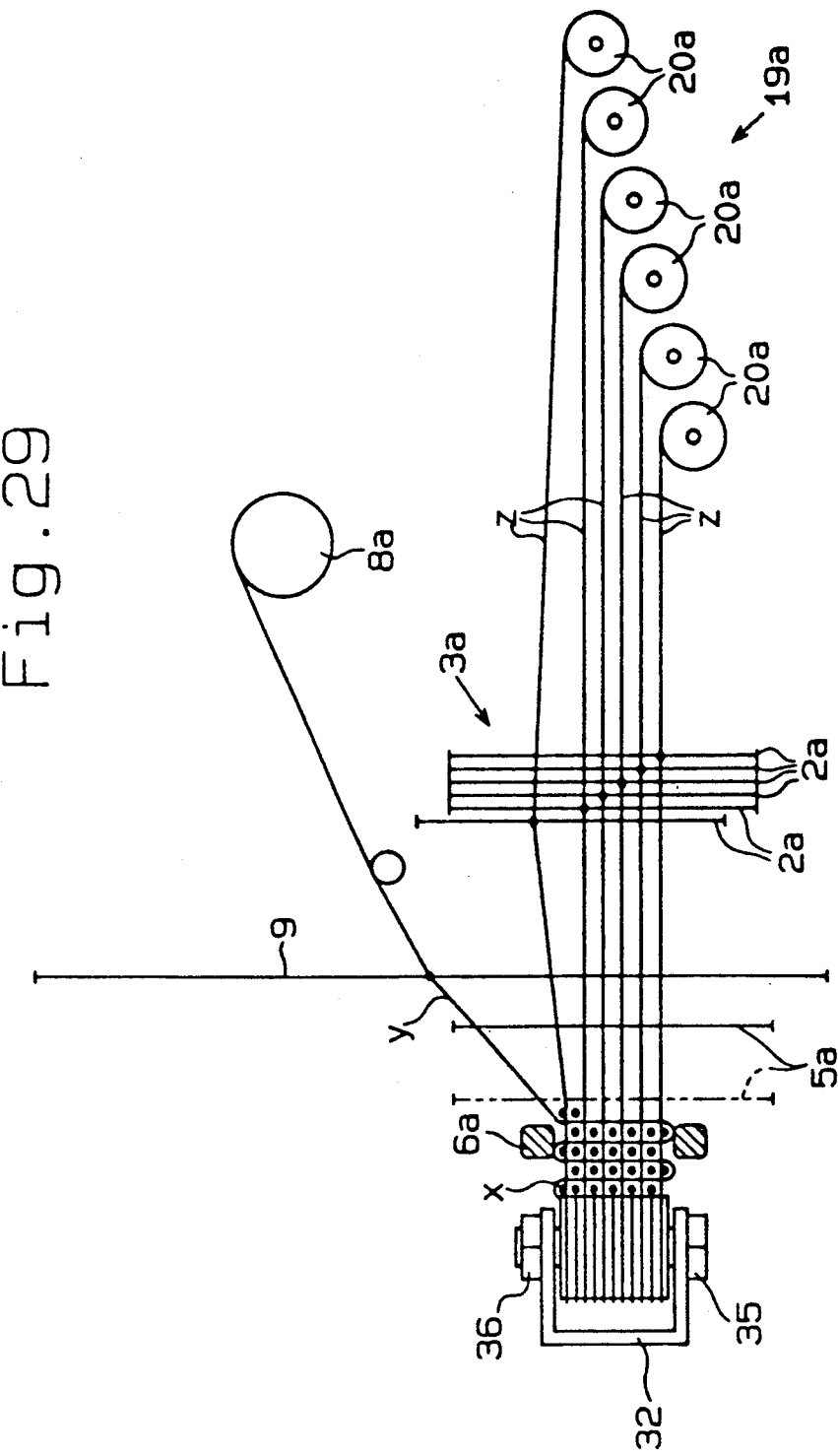
FIG. 29 is a diagrammatic side view of the weaving arrangement shown in FIG. 28 at a more advanced stage.
Figure 30:
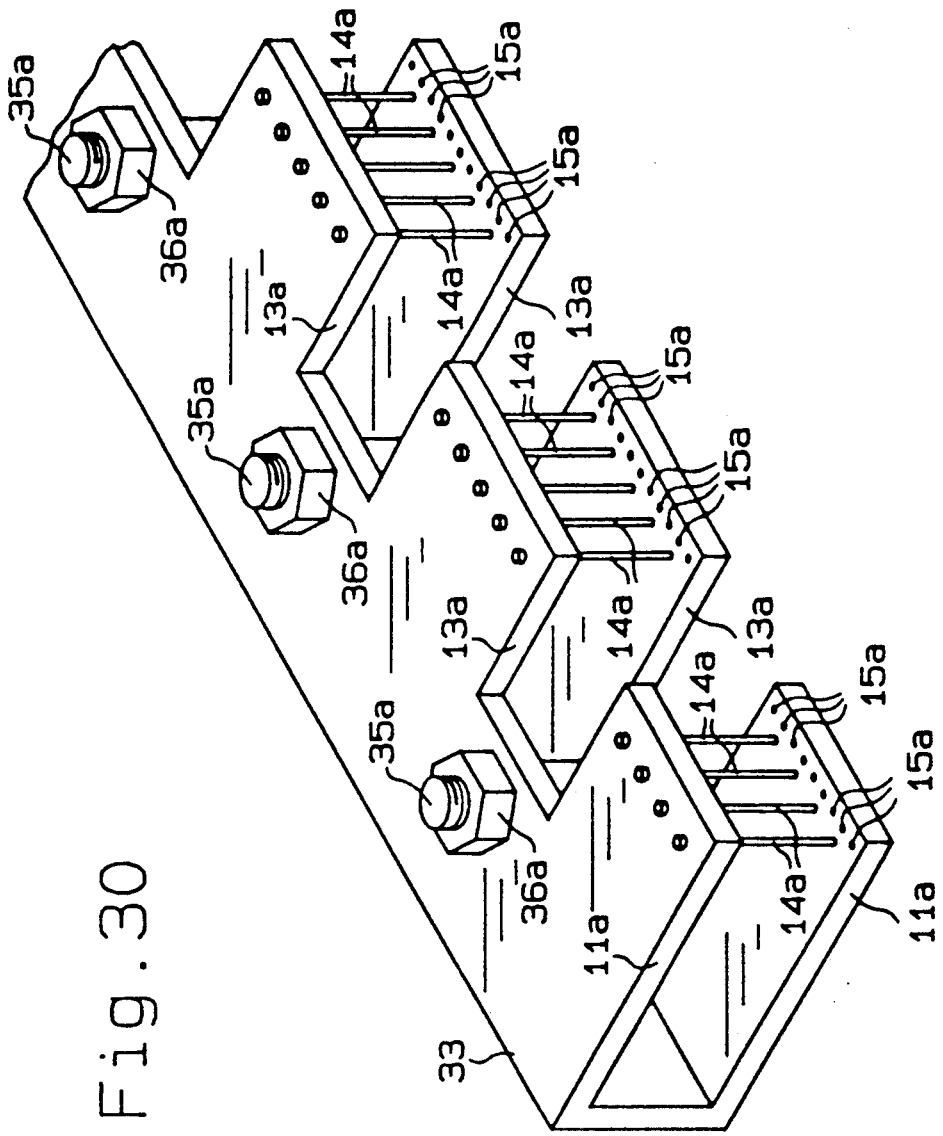
FIG. 30 is a diagrammatic perspective view of a support member.

Support member 32 appears channel shaped when viewed from the side as in FIG. 28. It includes a bolt 35 which extends transversely through the channel to support a linkage member 21. The bolt 35 is held in place by nut 36. The other support member 33 is formed as a continuation of support member 10 which was previously described. In essence, a plurality of support members 10 are connected side by side to form support member 33. Again, the components of support member 33 are labeled with numbers corresponding to the like components of support member 10 with the addition of the letter "a" to omit a repetitive explanation.

To initiate weaving, the weft and warp strings for a particular protruding portion are wrapped around a linkage member 21. The warp strings are passed through healds 2a of a warp opening device 3a to be wound around a beam 20a on warp feed structure 19a. The Y weft strings are passed through a weft heald 4a to be wound about a beam 8a of weft feed structure. The X weft string is wound around a bobbin (not shown) and fitted on a shuttle (not shown). As indicated above, the opposite end of the X weft string and the second end of one of the Y weft strings are used as warps and therefore are passed through appropriate healds 2a to warp feed structure 19a. After all of the warp Z and Y weft strings have been strung and wound around their respective beams, the X weft string is manually weaved into the intervals between adjacent warp columns moving successively from the top to the bottom columns. At this stage, the warps Z, as well as both the X and Y wefts are wound around the outer periphery of the linkage member 21. Additionally, the first phase of the X wefts is completed. The linkage member 21 is then secured to supporting member of the three dimensional weaving apparatus as seen in FIG. 28. In this initial state, the supporting member 21 is positioned close to the foreweaving frame 6a, the weft heald 4a is situated in its lowered position and the healds 2a of warp opening device 3a are located at their upper positions. The X weft string is positioned as shown in FIG. 28 between the bottom warp column and the Y weft strings.

Once the weaving apparatus has been configured, the healds 2a are successively moved downward one by one beginning with the heald furthest from the foreweaving frame 6a to sequentially form warp openings between each successive column pair beginning with the lowest column and moving upwards. The shuttle is passed through these openings one after another to lay the X wefts into the interstices between the various warp columns. Thus, the X wefts perpendicularly cross the warps Z. A reed 5a is then moved from its withdrawn position to its beating position to press the X wefts against the weaving side of the foreweaving frame to accomplish a beating. After the X weft has been laid for the uppermost warp opening, the weft heald 4a is moved upward to move the Y wefts upwards through the interstices between adjacent warp rows. The healds 2a of warp opening device 3a are then moved successively downward beginning with the heald 2a closest to the foreweaving frame 6a to once again create a succession of warp openings through which the shuttle is successively passed. Once each of the X warps have been laid, the reed is used to beat the newly laid warps. Once all of the warps have been laid and beaten, the weft heald 4a is returned to its lowered position. The insertion of the X and Y wefts are alternatingly performed in the manner described above in order to weave the three dimensional fabric F. Simultaneously, the supporting member 32 is moved horizontally away from the foreweaving frame 6a as the weaving proceeds. After six phases have been completed, the weaving is temporarily stopped while the remainder of the protruding portions are prepared and the weaving apparatus is set up to the desired size.

The remainder of the protruding portions of the three dimensional fabric are then created in the same manner as described above. After all of the protruding portions have been woven, the linkage members are set in supporting member 33 by means of the bolts 35a and nuts 36a. A predetermined number of warps Z2 and first wefts Y2 are prepared on each side of the woven protruding portions in the same manner as described with respect to the third embodiment. The warps Z and the wefts Y of the prepared protruding portions, as well as the additional warps Z2 and wefts Y2 that are to be added are all strung to their appropriate feed beams 20a or 8a through their appropriate heald 2a or 4a.

Figure 31:
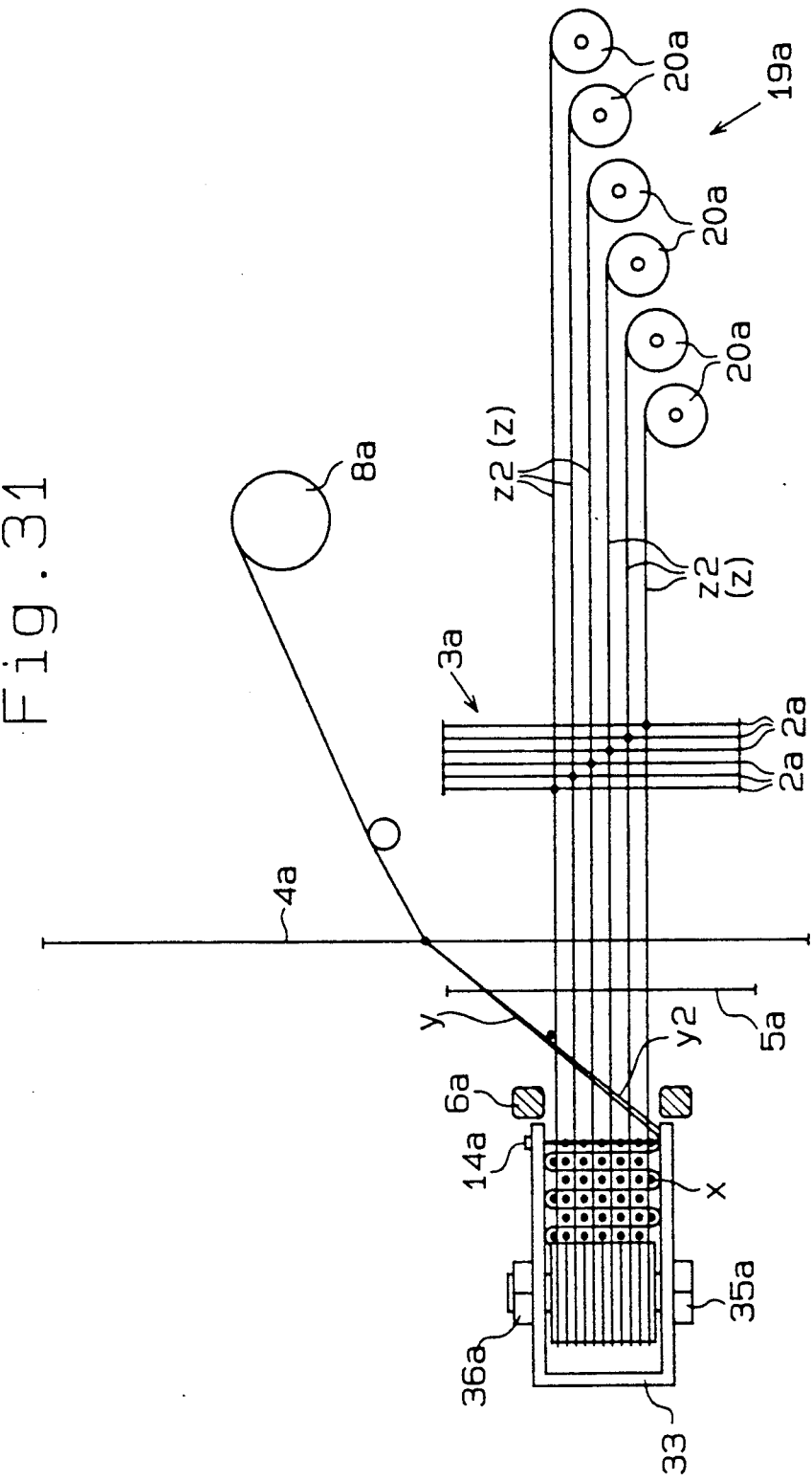
FIG. 31 is a diagrammatic side view of the weaving arrangement shown in FIGS. 28 and 29 at a more advanced stage.

The extraneous X weft strings (that is all but one) are cut off and the remaining X weft string ( which is arranged at an outside end of the protruding portions) is then used for further weaving. As can be seen in FIG. 31, the weft heald 4a is arranged at its upper position and the healds 2a of the warp opening device 3a are arranged at their lowered positions. The X weft string is inserted into the opening between the warps of the top column and the wefts Y and Y2. The warp opening device 3a is then actuated to sequentially spread adjacent warp columns from top to bottom. The X wefts are sequentially inserted into these openings and beaten by the reed 5a. The Y and Y2 wefts are then laid by changing the orientation of the weft heald 4a. The insertion of the Y and Y2 wefts and the insertion of the X wefts are alternately performed by moving the weft heald 4a up and down and by passing the shuttle through the warp openings as described above. In this manner, the main body portion of the three dimensional fabric F is generated.

Figure 32:
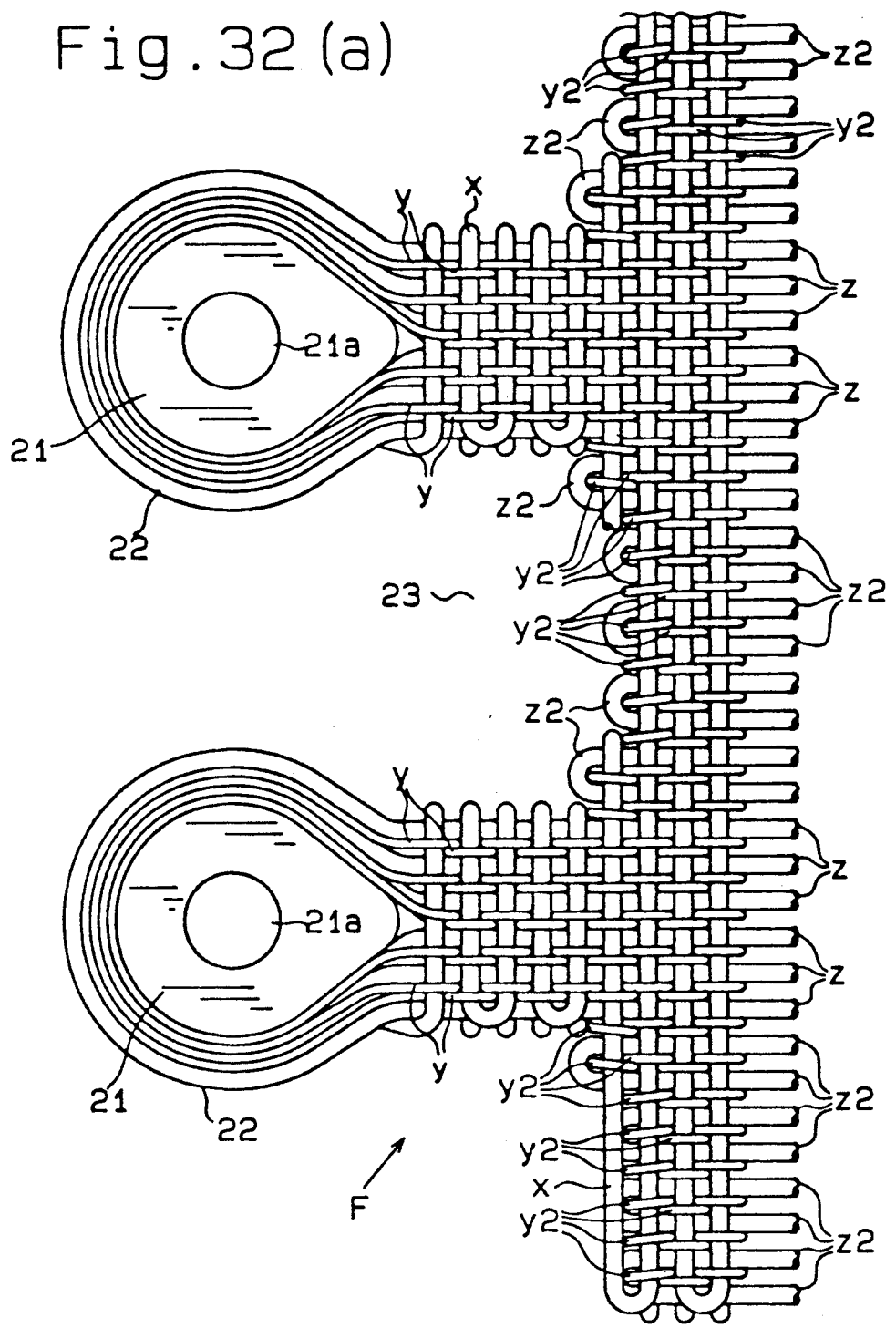
FIG. 32(a) is a plan view of a fifth embodiment of the three dimensional fabric of the present invention.
FIG. 32(b) is a diagrammatic plan view of an overleafed linkage arrangement using three dimensional fabrics similar to the one shown in FIG. 32(a).

Referring next to FIGS. 32 (a) and (b), a fifth embodiment of the invention will be described. The Y and Y2 wefts in the previously described embodiments have each used a single string that is threaded between adjacent warp rows. In the embodiment shown in FIG. 32(a), a pair of weft strings (Y or Y2) are extended between each adjacent pair of warp rows. The diameter of each of the paired weft strings is smaller than those of the warp strings and the X weft string. The paired weft strings are arranged such that they oppose each other. That is, they turn around opposite ends of fabric after each X weft interval. During weaving, two weft heald are used with each feeding one set of the paired Y and Y2 weft strings. To fabricate such an arrangement, the weft healds operate opposite one another such that when one is lifted to its up position, there other weft heald is in its down position and vice versa. During weaving of the X weft, the shuttle is pasted through warp openings in the normal fashion. However, when the Y wefts are laid, the healds 4(a) move in opposite directions to lie the paired weft Y and Y2 string perpendicularly over the X weft.

Figure 32B:
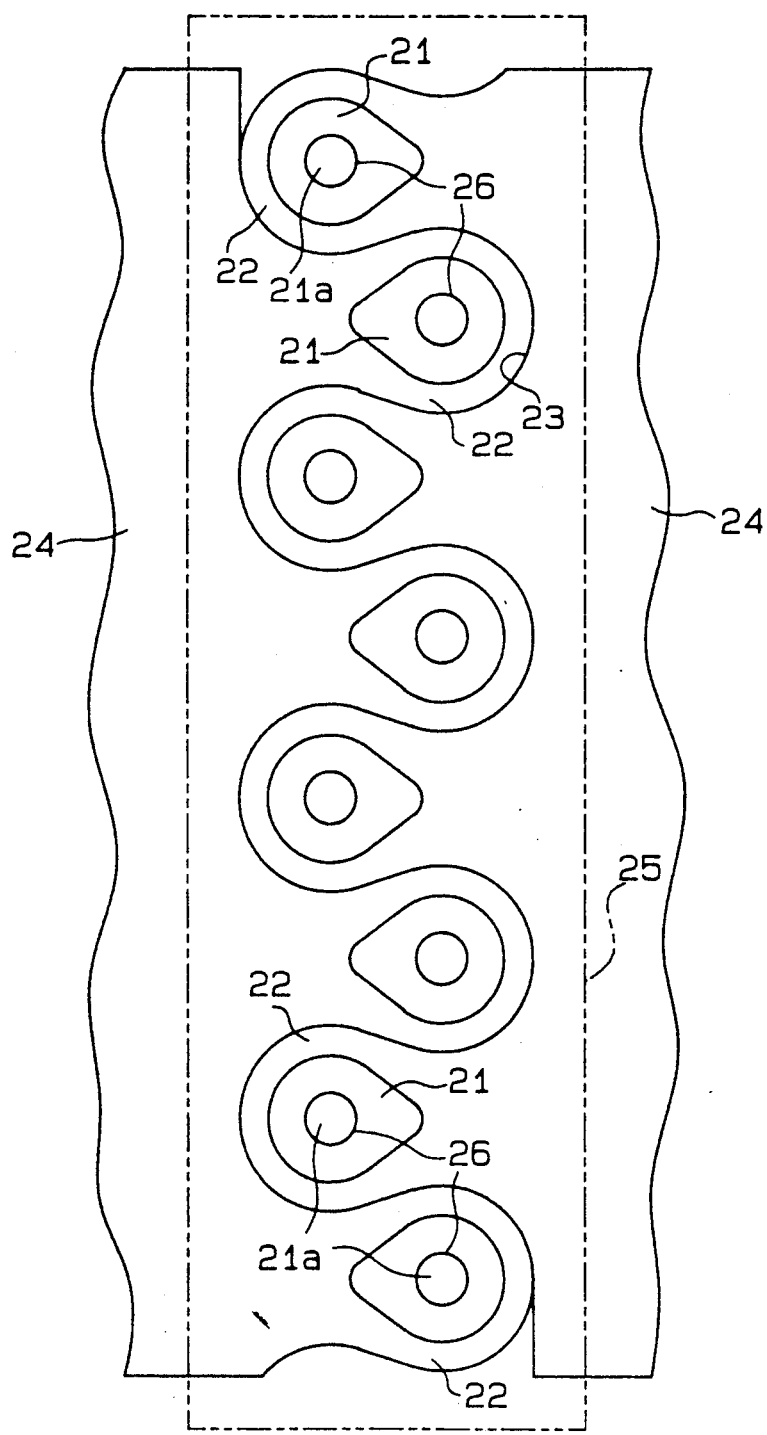

The described configuration allows finer shaping of the openings 23 so that they more closely resemble the contour of the protruding portions 22. Accordingly, the spaces within the interleaved protruding portions 22 are reduced as seen in FIG. 32(b).

Figure 33:
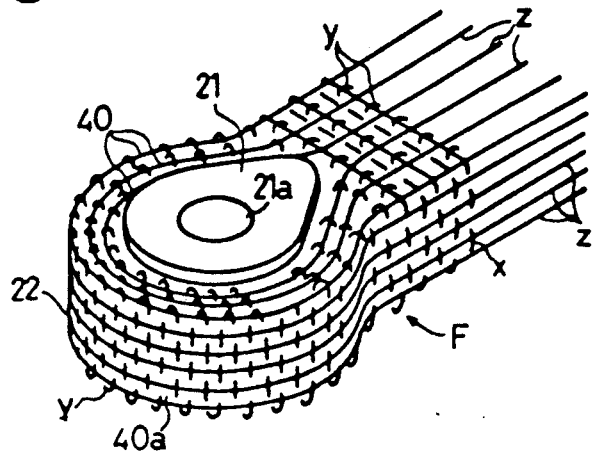
FIG. 33 is a diagrammatic perspective view of the protruding portion of a three dimensional fabric incorporating laminated cloths wrapped about the linkage mechanism.
Figure 36:
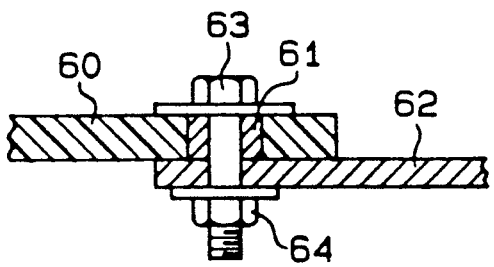
FIG. 36 is a sectional side view of a prior art linkage arrangement for joining composite members and structural members.
Figure 37:
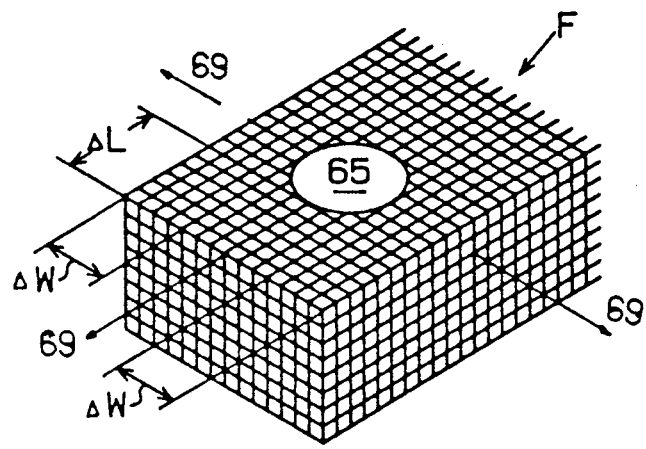
FIG. 37 is a diagrammatic perspective view of a punched three dimensional fabric.

Referring next to FIG. 33, the strings wound about the linkage member 21 as described in the fourth and fifth embodiments can alternatively be woven into a plurality of cloth layers 40 as set forth in the second described embodiment. The cloth layers 40 have a cloth portion 40a which is sized appropriately to be wrapped around the linkage member 21.

Figure 34:
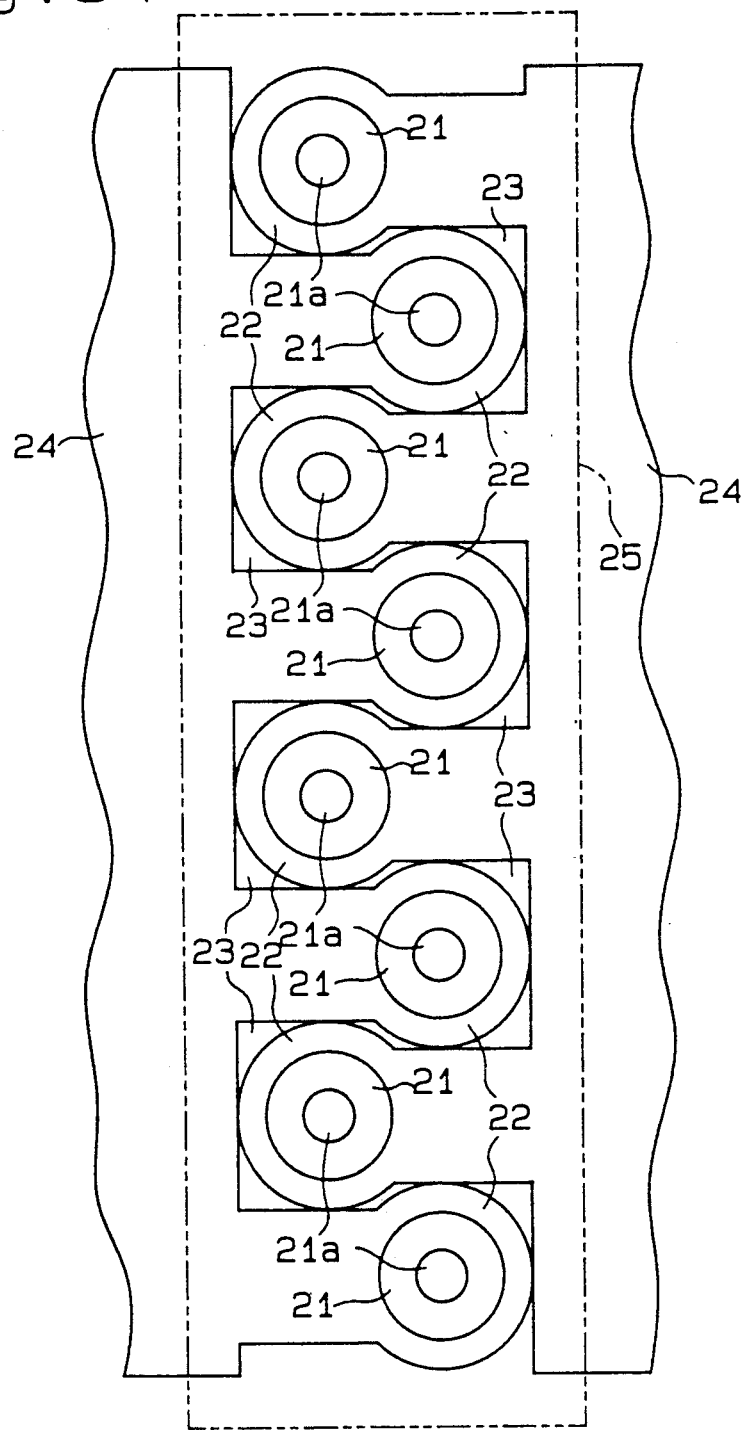
FIG. 34 is a diagrammatic plan view of an overleafed linkage arrangement using three dimensional fabrics having cylindrical linkage members.

When protruding portions 22 are utilized in a composite material 24, the tapered shape of linkage member 21 is preferred in order to prevent distortions of the interlinked protruding portions 22 under the influence of a tensile force. However, other shapes such as the cylindrical linkage member shapes shown in FIG. 34 can be used as well so long as they may be fitted into the openings 23 between adjacent protruding portions 22.

Figure 35:
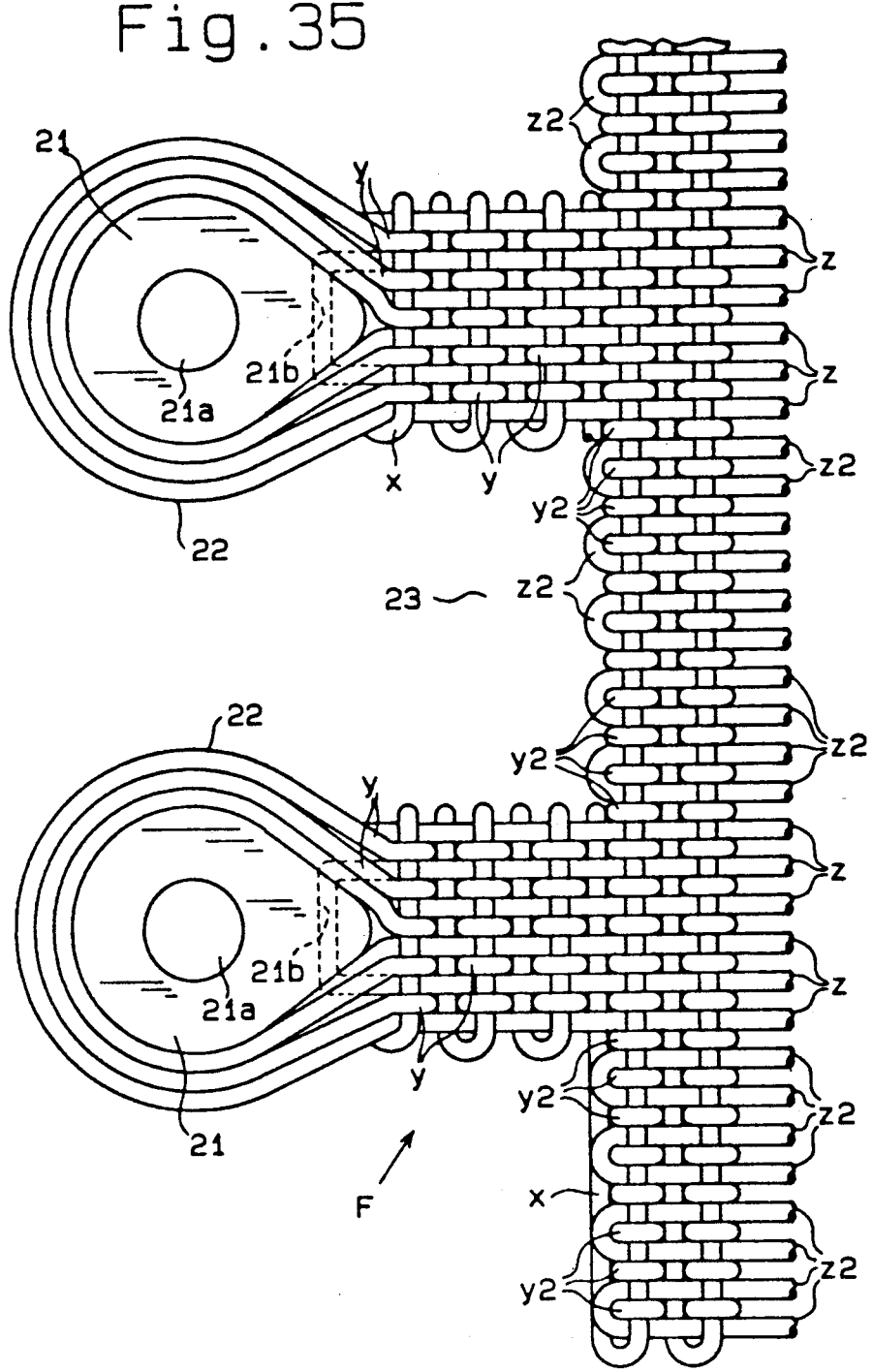
FIG. 35 is a plan view of yet another embodiment of the invention that incorporates a string insertion hole adjacent within the linkage member.

The linkage member 21 may also be outfitted with a string insertion hole as previously described with respect to FIGS. 12 and 13. As shown in FIG. 35, a string insertion hole 21b is cut into the tapered portion of the linkage member 21 to receive one or more weft or warp strings.

Although only a few embodiments of the present invention have been described herein, it should be understood that the present invention may be embodied in many other specific forms without departing from the spirit or scope of the invention. Particularly, it should be appreciated that the actual shape of the solid members woven into the three dimensional fabric may be widely varied to meet the needs of a particular design. Although the embodiments described each utilize linkage members adapted to receive a bolt or the like, this is not a requirement and indeed, the solid members woven into the three dimensional fabric may even be other than linkage members.

Further, the actual form of the fabric created and the routing of the various warp and weft strings about the linkage member may be widely varied in accordance with the teachings herein. Therefore, the present examples and embodiments are to be considered as illustrative and not restrictive, and the invention is not to be limited to the details given herein, but may be modified within the scope of the appended claims.

We claim:

1. A three dimensional fabric comprising:
a multiplicity of strings arranged and woven to form a multiplicity of warps arranged in a plurality of rows and columns, a plurality of first wefts crossing the warp columns in the interstitial spaces between adjacent warp rows, and a plurality of second wefts crossing said warps and said first wefts in the interstitial spaces between adjacent warp columns; and
a solid member that is incorporated into the body of the three dimensional fabric by a plurality of said strings that are wound about the outer periphery of the solid member.

2. A three dimensional fabric as recited in claim 1 wherein at least some of said warp strings are wound about the solid member.

3. A three dimensional fabric as recited in claim 1 wherein the solid member has a borehole extending therethrough that is adapted to receive a linking member from an external object in order to couple the three dimensional fabric to the external object.

4. A three dimensional fabric as recited in claim 1 wherein the wound strings are woven to form a cloth portion that wraps around at least a portion of the solid object.

5. A three dimensional fabric as recited in claim 1 wherein:
the solid member is cylindrical and includes a pair of flanges extending radially outward from the opposite ends of the cylinder; and
the wound strings are wound about the periphery of the cylinder between the flanges.

6. A three dimensional fabric as recited in claim 5 wherein the solid member includes a plurality of parallel grooves adapted to receive the wound strings.

7. A three dimensional fabric as recited in claim 1 wherein:
the solid member includes an insertion hole extending through the body of the solid member; and
at least one of said strings is passed through the insertion hole to further anchor the solid member within the body of the three dimensional fabric.

8. A three dimensional fabric as recited in claim 7 wherein the strings passing through the insertion hole are wound strings.

9. A three dimensional fabric as recited in claim 1 wherein said solid member is a linking member adapted to couple the fabric to an external member.

10. A three dimensional fabric comprising:
a multiplicity of strings arranged and woven to form a multiplicity of warps arranged in a plurality of rows and columns, a plurality of first wefts crossing the warp columns in the interstitial spaces between adjacent warp rows, and a plurality of second wefts crossing said warps and said first wefts in the interstitial spaces between adjacent warp columns;
a plurality of linkage members, each said linkage members being incorporated into the body of the three dimensional fabric by a plurality of said strings that are wound about the outer periphery of the linkage members; and
wherein the fabric is shaped to include a plurality of protruding portions that extend outward in the same direction from a main body portion of the fabric such that they define openings between adjacent protruding portions, each said protruding portion carrying one of said linkage members.

11. A three dimensional fabric as recited in claim 10 wherein each said protruding portion has a base end adjacent the main body of the fabric and an enlarged tip end extended away from the main body of the fabric that is wider than the base portion of the protruding portion, the protruding portions being tapered between their tip and base ends and arranged such that the openings defined between adjacent protruding portions are sized to receive members that correspond in shape and size to the protruding portions.

12. A linkage structure for joining a pair of three dimensional fabrics as defined in claim 11, the fabrics being arranged such that their protruding portions are interleaved into the opposing fabric's openings, the linkage structure comprising:
   a pair of linking plates arranged to sandwich the interleaved protruding portions; and
   a linking arrangement for coupling the linkage members carried by the interleaved protruding portions to the linking plates.

13. A linkage structure as recited in claim 12 wherein each said linkage members has a borehole extending axially therethrough and said linking arrangement includes a plurality of pins that extend between said linking plates through the boreholes in said linkage members.

14. A three dimensional fabric as recited in claim 10 wherein the woven string portions of the fabric are impregnated with a hardenable material to form a composite member.

15. A three dimensional fabric as recited in claim 10 wherein:
   said linkage members have a rounded peripheral portion facing away from the main body portion of the three dimensional fabric and tapered peripheral side portions facing towards the main body portion of the three dimensional fabric; and
   said wound strings are wound about the rounded peripheral and tapered peripheral side portions of the linkage members.

* * * * *